United States Patent
Shi et al.

(10) Patent No.: US 11,922,935 B2
(45) Date of Patent: Mar. 5, 2024

(54) VOICE INTERACTION METHOD AND APPARATUS, TERMINAL, AND STORAGE MEDIUM

(71) Applicant: Huawei Technologies Co., Ltd., Shenzhen (CN)

(72) Inventors: Zijuan Shi, Shanghai (CN); Weiran Nie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 429 days.

(21) Appl. No.: 17/179,764

(22) Filed: Feb. 19, 2021

(65) Prior Publication Data

US 2021/0183386 A1 Jun. 17, 2021

Related U.S. Application Data

(63) Continuation of application No. PCT/CN2020/074988, filed on Feb. 13, 2020.

(30) Foreign Application Priority Data

Aug. 15, 2019 (CN) .......................... 201910755150.6

(51) Int. Cl.
 *G10L 15/22* (2006.01)
 *G10L 15/18* (2013.01)
(52) U.S. Cl.
 CPC .......... *G10L 15/22* (2013.01); *G10L 15/1815* (2013.01)

(58) Field of Classification Search
 CPC ................ G10L 15/22; G10L 15/1815; G10L 2015/223; G10L 2015/225; G06F 3/167; H04M 2201/40; H04M 2250/74
 See application file for complete search history.

(56) References Cited

U.S. PATENT DOCUMENTS

| | | | |
|---|---|---|---|
| 10,051,600 B1 | 8/2018 | Zhong et al. | |
| 11,501,770 B2 * | 11/2022 | Chun | ...................... G10L 15/22 |
| 2003/0220793 A1 | 11/2003 | Kosaka et al. | |
| 2015/0213796 A1 * | 7/2015 | Waltermann | ............ G10L 15/22 |
| | | | 704/257 |
| 2017/0010859 A1 | 1/2017 | Hirai | |
| 2019/0138330 A1 | 5/2019 | Wu | |
| 2019/0198019 A1 | 6/2019 | Xu et al. | |
| 2023/0145603 A1 * | 5/2023 | Sung | ................... G10L 15/1822 |
| | | | 715/728 |

FOREIGN PATENT DOCUMENTS

| | | | | |
|---|---|---|---|---|
| CN | 103226949 A | * | 7/2013 | ............. B60K 35/00 |
| CN | 107293294 A | | 10/2017 | |
| CN | 107316643 A | | 11/2017 | |
| CN | 107424601 A | | 12/2017 | |
| CN | 107437416 A | | 12/2017 | |
| CN | 108320742 A | | 7/2018 | |
| CN | 108337362 A | | 7/2018 | |

(Continued)

*Primary Examiner* — Abul K Azad

(74) *Attorney, Agent, or Firm* — Conley Rose, P.C.

(57) ABSTRACT

A voice interaction method, where a service type set on which a user has a voice interaction intention is predicted based on a target event that can trigger voice interaction, and when a service type of a first service expressed by a voice instruction is a target service type in the service type set, the first service is executed.

26 Claims, 7 Drawing Sheets

(56) References Cited

FOREIGN PATENT DOCUMENTS

| | | | |
|---|---|---|---|
| CN | 108597519 | A | 9/2018 |
| CN | 108694947 | A | 10/2018 |
| CN | 109243450 | A | 1/2019 |
| CN | 109285547 | A | 1/2019 |
| CN | 109326289 | A | 2/2019 |
| CN | 109473100 | A | 3/2019 |
| CN | 109545206 | A | 3/2019 |
| CN | 109671435 | A | 4/2019 |
| EP | 1887482 | A1 | 2/2008 |
| JP | 2003131691 | A | 5/2003 |
| JP | 2006251298 | A | 9/2006 |
| JP | 2019105868 | A | 6/2019 |
| JP | 2019117623 | A | 7/2019 |
| WO | 2015162638 | A1 | 10/2015 |
| WO | 2019108329 | A1 | 6/2019 |

* cited by examiner

VOICE INTERACTION METHOD AND APPARATUS, TERMINAL, AND STORAGE MEDIUM

CROSS-REFERENCE TO RELATED APPLICATIONS

This application is a continuation of International Patent Application No. PCT/CN2020/074988 filed on Feb. 13, 2020, which claims priority to Chinese Patent Application No. 201910755150.6 filed on Aug. 15, 2019. The disclosures of the aforementioned applications are hereby incorporated by reference in their entireties.

TECHNICAL FIELD

This application relates to the field of terminal technologies, and in particular, to a voice interaction method and apparatus, a terminal, and a storage medium.

BACKGROUND

With development of terminal technologies, a growing quantity of terminals support a voice interaction function. A user can perform human-computer interaction with a terminal through a voice such that both hands are freed, and human-computer interaction efficiency is increased.

Currently, a voice interaction procedure usually includes that when a user wants to perform voice interaction with a terminal, first, the user utters a wakeup word, and the terminal collects a voice instruction, and determines whether the voice instruction includes the wakeup word. If the voice instruction includes the wakeup word, the terminal is switched from a standby state to a working state, that is, the terminal is woken up. Then, the user expresses a service that needs to be processed by the terminal, and the terminal collects a voice instruction again, determines, according to the voice instruction, the service that needs to be processed, and processes the service. In an example scenario, it is assumed that a wakeup word of an in-vehicle terminal is "Hello, Alice". During driving, when a user starts a radio station and expects the in-vehicle terminal to play a song, the user needs to say "Hello, Alice", and the terminal is woken up. When the user says "Please play a song of East Radio Station", the in-vehicle terminal automatically adjusts a radio station to East Radio Station and plays a song of East Radio Station.

When performing voice interaction using the foregoing method, a user needs to first utter a wakeup word to wake up a terminal to process a service, causing a relatively cumbersome operation and low efficiency.

SUMMARY

Embodiments of this application provide a voice interaction method and apparatus, a terminal, and a storage medium, to resolve technical problems of a cumbersome operation and low efficiency in voice interaction in a related technology. The technical solutions are as follows.

According to a first aspect, a voice interaction method is provided. The method includes determining that a target event is detected, where the target event is an event that can trigger voice interaction, querying a mapping relationship based on the target event, to obtain a service type set, where the service type set includes one or more target service types, collecting a voice instruction, obtaining, based on semantic information corresponding to the voice instruction, a first service corresponding to the semantic information, and executing the first service according to the voice instruction if a service type of the first service is any target service type in the service type set.

The embodiments provide a method for triggering wakeup word-free voice interaction. The service type set on which a user has a voice interaction intention is predicted based on the target event that can trigger voice interaction. If the service type of the first service expressed by the voice instruction is a target service type in the service type set, the first service is executed. A cumbersome operation that the user needs to frequently utter a wakeup word in a voice interaction process is omitted such that a problem of extremely low voice interaction efficiency caused by frequently uttering the wakeup word is resolved, an operation is more convenient, and the voice interaction process is more natural and personalized, thereby improving user experience of voice interaction.

Optionally, determining that a target event is detected includes determining that a first operation of the user is detected, and querying a mapping relationship based on the target event, to obtain a service type set includes querying the mapping relationship based on the first operation, to obtain the service type set, where the target service types included in the service type set are service types corresponding to one or more target second operations, and the one or more target second operations are consecutive operations associated with the first operation.

Generally, if the user performs any operation, the user consecutively performs a next operation, and therefore an intention of performing voice interaction on a service corresponding to the next operation is generated. In this optional manner, a rule that operations are consecutive is fully used, to map an operation currently performed by the user to a service type corresponding to a next operation to be performed at a specific probability such that when the user performs an operation, a service type on which the user wants to perform voice interaction can be accurately predicted, thereby ensuring accuracy of the target service type.

Optionally, determining that a target event is detected includes receiving a notification message from an operating system or an application, and querying a mapping relationship based on the target event, to obtain a service type set includes querying the mapping relationship based on the notification message, to obtain the service type set, where the target service type included in the service type set is message viewing or message processing corresponding to the notification message.

Generally, if a terminal receives the notification message, the user has a requirement of viewing or processing the notification message, and therefore a voice interaction intention of viewing or processing the message is generated. In this optional manner, the user requirement of viewing or processing the notification message is taken into full consideration, to map the event of receiving the notification message to a service type of message viewing or processing such that when the notification message is received, a service type on which the user wants to perform voice interaction can be accurately predicted, thereby ensuring accuracy of the target service type.

Optionally, the notification message includes at least one of a call notification, a short message service message, an instant messaging message, and an alarm message, and the querying the mapping relationship based on the notification message, to obtain the service type set includes at least one of querying the mapping relationship based on the call notification, to obtain the service type set, where the target service type included in the service type set is call answering, querying the mapping relationship based on the short message service message or the instant messaging message, to obtain the service type set, where the target service type included in the service type set is message viewing or message replying, and querying the mapping relationship based on the alarm message, to obtain the service type set, where the target service type included in the service type set is troubleshooting or information query.

Optionally, determining that a target event is detected includes determining that a current environment parameter meets a first condition, and querying a mapping relationship based on the target event, to obtain a service type set includes querying the mapping relationship based on the environment parameter, to obtain the service type set, where the target service type included in the service type set is environment parameter adjustment.

Generally, an environment affects a user perception, and the user has a requirement of responding to the environment. For example, if an environment parameter changes, the user has a requirement of adjusting the environment parameter, and therefore a voice interaction intention of adjusting the environment parameter is generated. In this optional manner, the user requirement of responding to the environment is taken into full consideration, to map the event that the environment parameter meets the first condition to a service type of environment parameter adjustment such that when the environment parameter meets the first condition, a service type on which the user wants to perform voice interaction can be accurately predicted, thereby ensuring accuracy of the target service type.

Optionally, determining that a target event is detected includes determining that progress of a current service meets a second condition, and the querying a mapping relationship based on the target event, to obtain a service type set includes querying the mapping relationship based on the current service, to obtain the service type set, where the target service type included in the service type set is a service type of the current service.

Generally, the progress of the current service affects a user perception, and the user has a requirement of responding to the current service. For example, if the current service is to end, the user usually wants to re-execute the current service, stop executing the current service, or adjust the current service. In this optional manner, a user requirement of responding to a service change is taken into full consideration, to map the event that the progress of the current service meets the second condition to the service type of the current service such that when the progress of the current service meets the second condition, a service type on which the user wants to perform voice interaction can be accurately predicted, thereby ensuring accuracy of the target service type.

With reference to the plurality of optional manners described above, there can be target events of a plurality of modes, and a target event of any mode can trigger a voice interaction function of a corresponding service type such that a wakeup wordfree wakeup function can be supported in a plurality of application scenarios, thereby expanding an application scope.

Optionally, a process of establishing the mapping relationship includes obtaining, based on a historical record, a historical service associated with a historical target event, and writing a service type of the historical service and the historical target event into the mapping relationship.

In this optional manner, because a personal behavior mode of a same user is regular, generally, it is very likely that a voice interaction intention generated by the user after a current target event occurs is the same as or similar to a voice interaction intention generated after a historical target event occurs at a historical time. Therefore, it is very likely that a service to be executed after the current target event occurs is the same as or similar to a service to be executed after the historical target event occurs at the historical time. Therefore, predicting, based on a historical record, a target service type to which a current voice interaction intention relates can improve accuracy of the target service type.

Optionally, a process of establishing the mapping relationship includes invoking a machine learning model, inputting a sample target event into the machine learning model, outputting a service type, and writing the output service type and the sample target event into the mapping relationship, where the machine learning model is used to predict a service type based on an event.

In this optional manner, pre-training can be performed using a large quantity of samples, to obtain the machine learning model such that the machine learning model learns a mapping relationship between an event and a service type. Therefore, a relatively accurate mapping relationship can be established using the machine learning model.

Optionally, after obtaining, based on semantic information corresponding to the voice instruction, a first service corresponding to the semantic information, the method further includes, if the service type of the first service is different from all target service types in the service type set, writing the service type of the first service into the mapping relationship.

In this optional manner, when the target event is detected next time, the obtained service type set includes the service type of the first service after the mapping relationship is queried such that after the user expresses the service type of the first service using a voice instruction, the first service is executed in response to the voice instruction. Therefore, in a historical running process of the terminal, if each time an event X is detected, the user expresses, through a voice, an intention of performing voice interaction on a service type Y, the event X and the service type Y may be added to the mapping relationship. In this way, as the voice interaction process proceeds, an association between an event and a service type can be found, and an event and a service type corresponding to semantic information can be used for a supplement and improvement. In addition, as services expand, the terminal can add a newly added event and a newly added service type to the mapping relationship such that extensibility and timeliness of the mapping relationship can be improved.

Optionally, querying a mapping relationship based on the target event, to obtain a service type set includes querying the mapping relationship based on the target event, to obtain the service type set and a probability corresponding to each target service type in the service type set, where the probability indicates a possibility of executing a service corresponding to the target service type. Before executing the first service according to the voice instruction if a service type of the first service is any target service type in the service type set, the method further includes filtering out a target service type whose probability does not meet a probability threshold from the service type set.

Optionally, after obtaining, based on semantic information corresponding to the voice instruction, a first service corresponding to the semantic information, the method further includes updating a probability in the mapping relationship based on the semantic information corresponding to the voice instruction.

In this optional manner, each time the target event occurs, the probability may be dynamically adjusted based on semantic information currently expressed by the user such that the probability is constantly corrected through iteration in a self-learning manner by evaluating correctness of a predicted service type, and a probability of each service type in the mapping relationship can be constantly optimized based on occurrence of the target event and semantics expressed by the user, and gradually better match a personal behavior habit of the user, thereby ensuring a more accurate mapping relationship.

Optionally, updating a probability in the mapping relationship based on the semantic information corresponding to the voice instruction includes, if the service type of the first service is any target service type in the service type set, increasing a probability corresponding to the service type of the first service in the mapping relationship.

In this optional manner, if a target event X corresponds to a target service type Y, and each time the target event X is detected, the user requires, through a voice, a service of the target service type Y to be executed, it indicates that the target service type Y is exactly a service type on which the user has a voice interaction intention after the target event X occurs. In this optional manner, a probability of the target service type Y increases constantly. Therefore, when the target event is detected again subsequently, the probability of the target service type Y meets a probability threshold such that the target service type Y is selected, and if a voice instruction expresses semantic information of the target service type Y, the terminal processes a service in response to the voice instruction.

Optionally, updating a probability in the mapping relationship based on the semantic information corresponding to the voice instruction includes, if the service type corresponding to the semantic information is different from all of the one or more target service types, decreasing a probability corresponding to the target event and the one or more target service types in the mapping relationship.

In this optional manner, if a target event X corresponds to a target service type Y, and each time the target event X is detected, the user does not require, through a voice, a service of the target service type Y to be executed, it indicates that the target service type Y is not a service type on which the user has a voice interaction intention after the target event X occurs. In this optional manner, a probability of the target service type Y decreases constantly. Therefore, when the target event X is detected again subsequently, the probability of the target service type Y does not meet a probability threshold such that the target service type Y is filtered out, and the terminal does not process the service of the target service type Y, thereby avoiding false wakeup.

Optionally, updating a probability in the mapping relationship based on the semantic information corresponding to the voice instruction includes, if the semantic information includes a wakeup word, increasing a probability corresponding to the service type of the first service in the mapping relationship.

In this optional manner, if a target event X corresponds to a target service type Y, and each time the target event X is detected, the user utters the wakeup word, it indicates that the target service type Y is exactly a service type on which the user has a voice interaction intention after the target event X occurs. In this optional manner, a probability of the target service type Y increases constantly. Therefore, when the target event is detected again subsequently, the probability of the target service type Y meets a probability threshold such that the target service type Y is selected, and if a voice instruction expresses semantic information of the target service type Y, the terminal processes a service in response to the voice instruction.

Optionally, after obtaining, based on semantic information corresponding to the voice instruction, a first service corresponding to the semantic information, the method further includes, if the service type of the first service is different from all target service types in the service type set, discarding the voice instruction.

In this optional manner, if the service type set does not include the service type of the first service, it indicates that the service type expressed by the user through a voice falls beyond a predicted service type range, the terminal incorrectly predicts the service type, and the user has no voice interaction intention. Therefore, the terminal may not respond to the voice instruction, but discard the voice instruction, to avoid false wakeup caused by service processing according to the voice instruction, and save buffer space occupied by the voice instruction.

According to a second aspect, a voice interaction apparatus is provided. The voice interaction apparatus has a function of implementing voice interaction in any one of the first aspect and the optional manners of the first aspect. The apparatus includes at least one module, and the at least one module is configured to implement the voice interaction method provided in any one of the first aspect and the optional manners of the first aspect.

According to a third aspect, a terminal is provided. The terminal includes one or more processors and one or more memories, the one or more memories store at least one instruction, and the instruction is loaded and executed by the one or more processors to implement the voice interaction method provided in any one of the first aspect and the optional manners of the first aspect.

According to a fourth aspect, a computer-readable storage medium is provided. The storage medium stores at least one instruction, and the instruction is loaded and executed by a processor to implement the voice interaction method provided in any one of the first aspect and the optional manners of the first aspect.

According to a fifth aspect, a computer program product is provided. The computer program product includes computer program code, and when the computer program code runs on a terminal, the terminal performs the voice interaction method provided in any one of the first aspect and the optional manners of the first aspect.

According to a sixth aspect, a chip is provided. The chip includes a processor configured to invoke, from a memory, an instruction stored in the memory and run the instruction such that a terminal on which the chip is installed performs the voice interaction method provided in any one of the first aspect and the optional manners of the first aspect.

According to a seventh aspect, another chip is provided. The chip includes an input interface, an output interface, a processor, and a memory, the input interface, the output interface, the processor, and the memory are connected through an internal connection path, the processor is configured to execute code in the memory, and when the code is executed, the processor is configured to perform the voice interaction method provided in any one of the first aspect and the optional manners of the first aspect.

DESCRIPTION OF EMBODIMENTS

To make the objectives, technical solutions, and advantages of this application clearer, the following further describes the implementations of this application in detail with reference to the accompanying drawings.

The following describes terms in this application.

A service type is a collective term of a type of service, and may also be referred to as a service field. For example, the service type may include message viewing, message processing, environment parameter adjustment, navigation, schedule consultation, an air conditioner, a radio station, music, vehicle control, mileage query, question and answer consultation, a game, system setting, vehicle control, charging, maintenance, and communication. Message viewing may include viewing a short message service message, viewing an instant messaging message of an instant messaging application, and viewing a push message of a resource recommendation application, and message processing may include call answering, message replying, troubleshooting, information query, and the like. Environment parameter adjustment may include dust concentration adjustment, humidity adjustment, light adjustment, noise intensity adjustment, temperature adjustment, and the like.

A service is a specific to-be-executed transaction. For example, services of the service type of message viewing may be viewing a session message X sent by a user A, viewing a group notice Y most recently posted in a group chat, viewing a discount message posted by a shopping application today, and the like, a service of the service type of environment parameter adjustment may be adjusting a temperature to 25° using an air conditioner, a service of the service type of music may be playing a latest song Z of a singer B, a service of the service type of navigation may be performing navigation to a cell F on a road E in a district D of a city C, a service of the service type of call answering may be answering a call of a caller ZZ, a service of the service type of message replying may be replying to a contact G with a short message service message "I am driving and I will reply later", and a service of the service type of the radio station may be starting East Radio Station.

The following provides an example description of an implementation environment.

Figure 1:
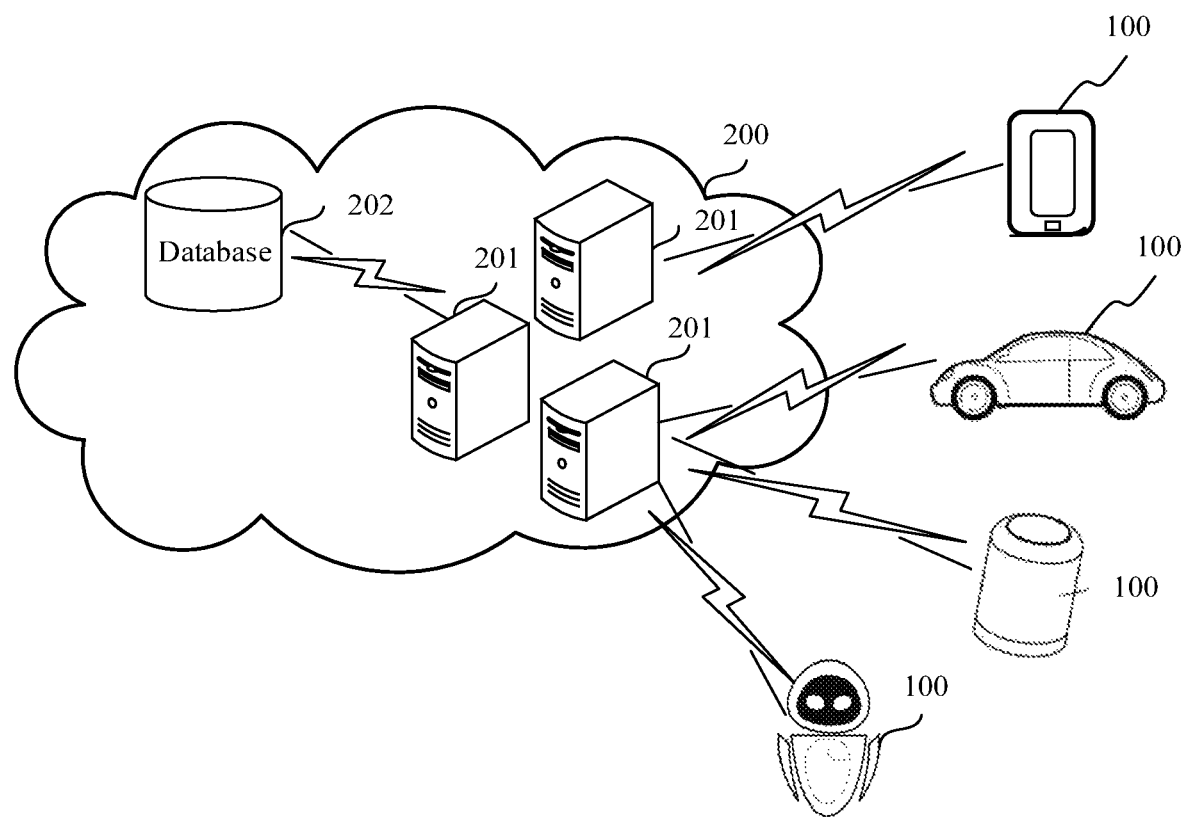
FIG. 1 is a schematic diagram of an implementation environment of a voice interaction method according to an embodiment of this application.

FIG. 1 is a schematic diagram of an implementation environment of a voice interaction method according to an embodiment of this application. The implementation environment includes a terminal 100 and a voice interaction platform 200.

The terminal 100 is connected to the voice interaction platform 200 using a wireless network or a wired network. The terminal 100 may be at least one of a smartphone, an intelligent sound box, a robot, an intelligent car, an in-vehicle terminal, a home device, a game host, a desktop computer, a tablet computer, an e-book reader, a smart television, a Moving Picture Experts Group (MPEG) Audio Layer III (MP3) player or an MPEG Audio Layer IV (MP4) player, and a portable laptop computer. An application supporting voice interaction is installed and run on the terminal 100. The application may be a voice assistant, an intelligent question and answer application, or the like. For example, the terminal 100 is a terminal used by a user, and a user account is used to log in to the application running on the terminal 100.

The voice interaction platform 200 includes at least one of one server, a plurality of servers, a cloud computing platform, and a virtualization center. The voice interaction platform 200 is configured to provide a background service for the application supporting voice interaction. For example, the voice interaction platform may establish a mapping relationship provided in the following method embodiment, and send the mapping relationship to the terminal 100 such that the terminal 100 performs voice interaction based on the mapping relationship.

Optionally, the voice interaction platform 200 includes a voice interaction server 201 and a database 202. The voice interaction server 201 is configured to provide a background service related to voice interaction. There may be one or more voice interaction servers 201. When there is a plurality of voice interaction servers 201, at least two voice interaction servers 201 are configured to provide different services, and/or at least two voice interaction servers 201 are configured to provide a same service, for example, provide a same service through load balancing. This is not limited in this embodiment of this application. The database 202 may be configured to store a mapping relationship. In addition, the database 202 may store a sample event and a sample service type such that the voice interaction server 201 reads the sample event and the sample service type from the database 202, obtains a machine learning model through training based on the sample event and the sample service type, and establishes the mapping relationship using the machine learning model.

The terminal 100 may be one of a plurality of terminals. In this embodiment, the terminal 100 is merely used as an example for description. A person skilled in the art may know that there may be more or fewer terminals 100. For example, there may be one terminal 100, or there are tens of, hundreds of, or a larger quantity of terminals 100, and in this case, the voice interaction system further includes another terminal. A quantity of terminals 100 and a device type of the terminal 100 are not limited in this embodiment of this application.

The following provides an example description of a hardware structure of a terminal.

Figure 2:
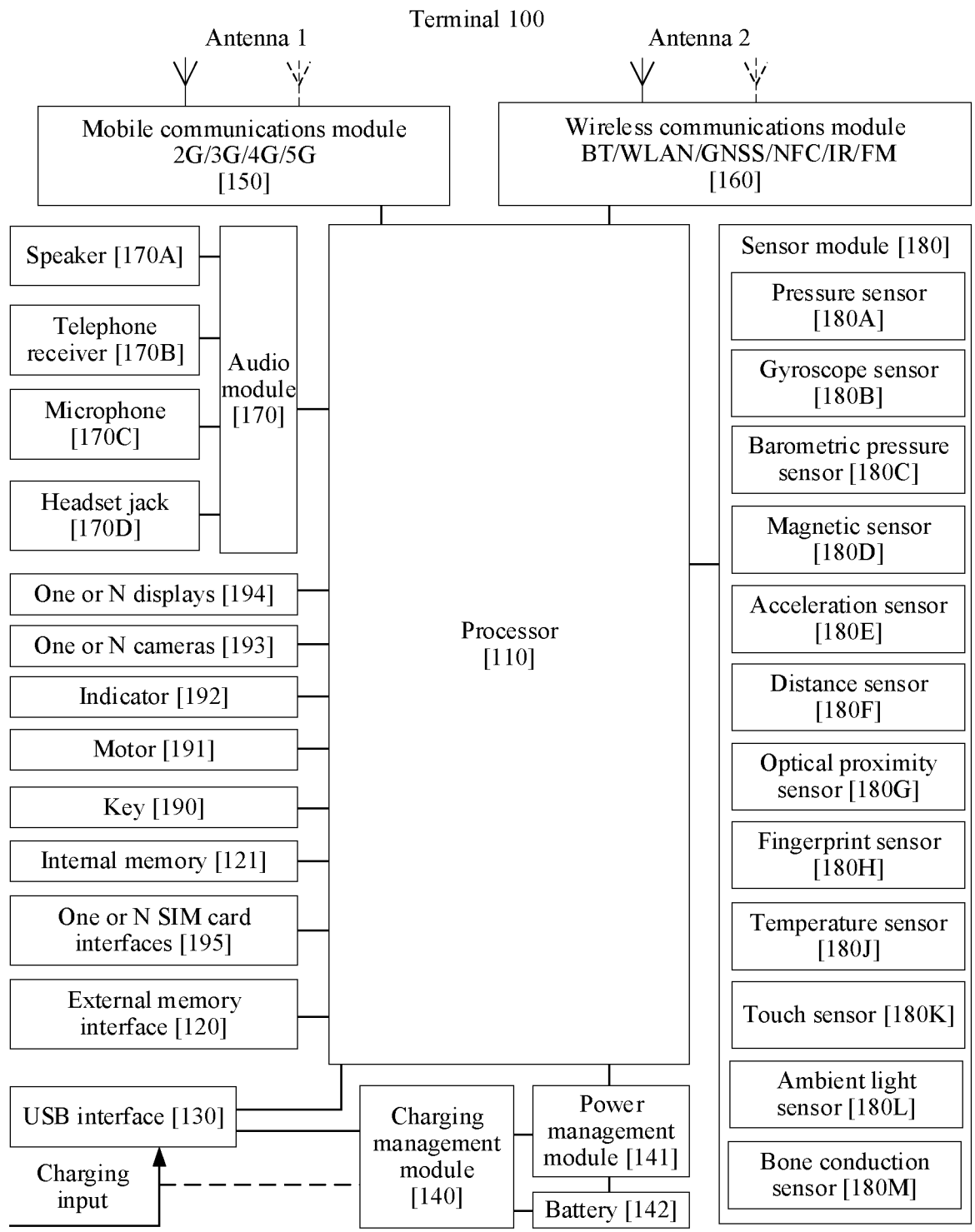
FIG. 2 is a schematic structural diagram of a terminal according to an embodiment of this application.

FIG. 2 is a schematic structural diagram of the terminal 100 according to an embodiment of this application.

The terminal 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, and a subscriber identity module (SIM) card interface 195. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of this application does not constitute a specific limitation on the terminal 100. In other embodiments of this application, the terminal 100 may include more or fewer components than those shown in the figure, or combine some components, or split some components, or have different component arrangements. The component shown in the figure may be implemented using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be standalone components, or may be integrated into one or more processors.

The controller may generate an operation control signal based on instruction operation code and a timing signal, to complete instruction fetching and instruction execution control.

A memory may be further disposed in the processor 110, and is configured to store an instruction and data. In some embodiments, the memory in the processor 110 is a cache memory, and the memory may store an instruction or data that is just used or used cyclically by the processor 110. If the processor 110 needs to use the instruction or the data again, the processor 110 may directly invoke the instruction or the data from the memory. Therefore, repeated access is avoided, and a waiting time of the processor 110 is reduced, thereby increasing system efficiency.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a MOBILE INDUSTRY PROCESSOR INTERFACE (MIPI), a general-purpose input/output (GPIO) interface, a SIM interface, a USB interface, and/or the like.

The I2C interface is a two-way synchronous serial bus, and includes a serial data line (SDA) and a serial clock line (SCL). In some embodiments, the processor 110 may include a plurality of groups of I2C buses. The processor 110 may be coupled to the touch sensor 180K, a charger, a flash, the camera 193, and the like using different I2C bus interfaces. For example, the processor 110 may be coupled to the touch sensor 180K using the I2C interface such that the processor 110 communicates with the touch sensor 180K through the I2C bus interface, to implement a touch function of the terminal 100.

The I2S interface may be used for audio communication. In some embodiments, the processor 110 may include a plurality of groups of I2S buses. The processor 110 may be coupled to the audio module 170 using the I2S bus, to implement communication between the processor 110 and the audio module 170. In some embodiments, the audio module 170 may transmit an audio signal to the wireless communications module 160 through the I2S interface, to implement a function of answering a call using a BLUETOOTH headset.

The PCM interface may also be used for audio communication to perform sampling, quantization, and coding of an analog signal. In some embodiments, the audio module 170 may be coupled to the wireless communications module 160 using the PCM bus interface. In some embodiments, the audio module 170 may also transmit an audio signal to the wireless communications module 160 through the PCM interface, to implement the function of answering a call using a BLUETOOTH headset. Both the I2S interface and the PCM interface may be used for audio communication.

The UART interface is a universal serial data bus, and is used for asynchronous communication. The bus may be a two-way communications bus. The UART interface converts to-be-transmitted data between serial communication and parallel communication. In some embodiments, the UART interface is usually configured to connect the processor 110 and the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music using a BLUETOOTH headset.

The MIPI interface may be configured to connect the processor 110 and a peripheral component such as the display 194 or the camera 193. The MIPI interface includes a Camera Serial Interface (CSI), a Display Serial Interface (DSI), or the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured using software. The GPIO interface may be configured as a control signal, or may be configured as a data signal. In some embodiments, the GPIO interface may be configured to connect the processor 110 and the camera 193, the display 194, the wireless communications module 160, the audio module 170, the sensor module 180, and the like. Alternatively, the GPIO interface may be configured as an I2C interface, an I2S interface, a UART interface, an MIPI interface, or the like.

The USB interface 130 is an interface complying with a USB standard, and may be a mini USB interface, a micro USB interface, a USB type-C interface, or the like. The USB interface 130 may be configured to connect to a charger to charge the terminal 100, and may also be configured to transmit data between the terminal 100 and a peripheral device. The USB interface 130 may also be configured to connect to a headset to play audio using the headset. The interface may be further configured to connect to another terminal such as an augmented reality (AR) device.

It may be understood that the interface connection relationship between the modules shown in this embodiment of this application is merely a schematic description, and does not constitute a structural limitation on the terminal 100. In other embodiments of this application, alternatively, the terminal 100 may use an interface connection manner different from that in the foregoing embodiment or a combination of a plurality of interface connection manners.

The charging management module 140 is configured to receive charging input from a charger. The charger may be a wireless charger, or may be a wired charger. In some embodiments of wired charging, the charging management module 140 may receive charging input from the wired charger through the USB interface 130. In some embodiments of wireless charging, the charging management module 140 may receive wireless charging input through a wireless charging coil of the terminal 100. When charging the battery 142, the charging management module 140 may further supply power to the terminal using the power management module 141.

The power management module 141 is configured to connect to the battery 142, the charging management module 140, and the processor 110. The power management module 141 receives input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (leakage or impedance). In other embodiments, the power management module 141 may also be disposed in the processor 110. In other embodiments, the power management module 141 and the charging management module 140 may also be disposed in a same component.

A wireless communication function of the terminal 100 may be implemented using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be multiplexed to improve antenna utilization. For example, the antenna 1 may be multiplexed into a diversity antenna of a wireless local area network. In other embodiments, the antenna may be used in combination with a tuning switch.

The mobile communications module 150 may provide a solution that is applied to the terminal 100 and that includes wireless communication such as second generation (2G)/third generation (3G)/fourth generation (4G)/fifth generation (5G). The mobile communications module 150 may include at least one filter, switch, power amplifier, low noise amplifier (LNA), and the like. The mobile communications module 150 may receive an electromagnetic wave using the antenna 1, perform processing such as filtering and amplification on the received electromagnetic wave, and send an electromagnetic wave obtained after processing to the modem processor for demodulation. The mobile communications module 150 may further amplify a signal obtained after modulation by the modem processor, and convert the signal into an electromagnetic wave and radiate the electromagnetic wave using the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to modulate a to-be-sent low-frequency baseband signal into an intermediate-high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal using an audio device (not limited to the speaker 170A, the telephone receiver 170B, and the like), or displays an image or a video using the display 194. In some embodiments, the modem processor may be a standalone component. In other embodiments, the modem processor may be independent of the processor 110 and disposed in a same component as the mobile communications module 150 or another function module.

The wireless communications module 160 may provide a solution that is applied to the terminal 100 and that includes wireless communication such as a wireless local area network (WLAN) (for example, a WI-FI network), BLUETOOTH (BT), a global navigation satellite system (GNSS), frequency modulation (FM), Near-Field Communication (NFC), and an infrared (IR) technology. The wireless communications module 160 may be one or more components integrated with at least one communications processing module. The wireless communications module 160 receives an electromagnetic wave using the antenna 2, performs frequency modulation and filtering processing on the electromagnetic wave signal, and sends a signal obtained after processing to the processor 110. The wireless communications module 160 may further receive a to-be-sent signal from the processor 110, perform frequency modulation and amplification on the to-be-sent signal, and convert the signal into an electromagnetic wave and radiate the electromagnetic wave using the antenna 2.

In some embodiments, the antenna 1 of the terminal 100 is coupled to the mobile communications module 150, and the antenna 2 is coupled to the wireless communications module 160 such that the terminal 100 can communicate with a network and another device using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a Quasi-Zenith Satellite System (QZSS), and/or a satellite based augmentation system (SBAS).

The terminal 100 implements a display function using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may use a liquid-crystal display (LCD), an organic light-emitting diode (LED) (OLED), an active-matrix OLED (AMOLED), a flexible LED (FLED), a mini-LED, a microLED, a micro-OLED, a quantum dot LED (QLED), or the like. In some embodiments, the terminal 100 may include one or N displays 194, where N is a positive integer greater than 1.

The terminal 100 may implement a photographing function using the ISP, the camera 193, the video codec, the GPU, the display 194, the application processor, and the like.

The ISP is configured to process data fed back by the camera 193. For example, during photographing, a shutter is opened, light is transmitted to a camera photosensitive element using a lens, an optical signal is converted into an electrical signal, and the camera photosensitive element transmits the electrical signal to the ISP for processing such that the electrical signal is converted into an image visible to a naked eye. The ISP may further perform algorithm optimization on noise, brightness, and a skin color of the image. The ISP may further optimize parameters such as exposure and a color temperature of a photographing scene. In some embodiments, the ISP may be disposed in the camera 193.

The camera 193 is configured to capture a still image or a video. An optical image of an object is generated using the lens and projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as red, green, and blue (RGB) or YUV. In some embodiments, the terminal 100 may include one or N cameras 193, where N is a positive integer greater than 1.

The digital signal processor is configured to process a digital signal. In addition to a digital image signal, the digital signal processor may process another digital signal. For example, when the terminal 100 selects a frequency, the digital signal processor is configured to perform Fourier transform and the like on frequency energy.

The video codec is configured to compress or decompress a digital video. The terminal 100 may support one or more video codecs. In this case, the terminal 100 may play or record videos in a plurality of encoding formats, for example, MPEG-1, MPEG-2, MPEG-3, and MPEG-4.

The NPU is a neural-network (NN) computing processor. Using a bio-neural network structure, for example, using a transfer mode between human brain neurons, the NPU quickly processes input information, and may further constantly perform self-learning. Applications of intelligent recognition and the like of the terminal 100, for example, image recognition, facial recognition, voice recognition, and text understanding may be implemented using the NPU.

The external memory interface 120 may be configured to connect to an external storage card such as a micro Secure Digital (SD) card, to extend a storage capability of the terminal 100. The external storage card communicates with the processor 110 through the external storage interface 120, to implement a data storage function. For example, a file such as music or a video is stored in the external storage card.

The internal memory 121 may be configured to store computer executable program code. The executable program code includes an instruction. The internal memory 121 may include a program storage area and a data storage area. The program storage area may store an operating system, an application required by at least one function (for example, a voice play function or an image play function), and the like. The data storage area may store data (for example, audio data or an address book) created in a process of using the terminal 100, and the like. In addition, the internal memory 121 may include a high-speed random-access memory (RAM), or may include a non-volatile memory such as at least one magnetic disk storage component, a flash memory component, or a Universal Flash Storage (UFS). The processor 110 executes various functional applications and data processing of the terminal 100 by running an instruction stored in the internal memory 121 and/or an instruction stored in the memory disposed in the processor.

The terminal 100 may implement an audio function such as music play or recording using the audio module 170, the speaker 170A, the telephone receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The terminal 100 may listen to music or listen to a hands-free call using the speaker 170A.

The telephone receiver 170B, also referred to as an "earpiece", is configured to convert an audio electrical signal into a sound signal. When listening to a call or voice information, the terminal 100 may listen to a voice by placing the telephone receiver 170B close to an ear.

The microphone 170C is configured to convert a sound signal into an electrical signal. When making a call or sending voice information, a user may utter a voice by making a mouth close to the microphone 170C, and input a sound signal into the microphone 170C. At least one microphone 170C may be disposed in the terminal 100. In other embodiments, two microphones 170C may be disposed in the terminal 100, to implement a denoising function in addition to collecting a sound signal. In other embodiments, three, four, or more microphones 170C may be disposed in the terminal 100, to collect a sound signal, perform denoising, identify a sound source, implement a directional recording function, and the like.

The headset jack 170D is configured to connect to a wired headset. The headset jack 170D may be the USB interface 130, a 3.5 millimeters (mm) Open Mobile Terminal Platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates having conductive materials. When a force acts on the pressure sensor 180A, a capacitance between electrodes changes. The terminal 100 determines pressure strength based on the change of the capacitance. When a touch operation is performed on the display 194, the terminal 100 detects strength of the touch operation based on the pressure sensor 180A. The terminal 100 may also calculate a touch position based on a detected signal of the pressure sensor 180A. In some embodiments, touch operations that are performed on a same touch position but have different touch operation strength may correspond to different operation instructions. For example, when a touch operation whose touch operation strength is less than a first pressure threshold is performed on a short message service message application icon, an instruction for viewing a short message service message is executed, or when a touch operation whose touch operation strength is greater than or equal to a first pressure threshold is performed on a short message service message application icon, an instruction for newly creating a short message service message is executed.

The gyroscope sensor 180B may be configured to determine a motion posture of the terminal 100. In some embodiments, angular velocities of the terminal 100 on three axes (that is, x, y, and z axes) may be determined using the gyroscope sensor 180B. The gyroscope sensor 180B may be used for photographing stabilization. For example, when a shutter is pressed, the gyroscope sensor 180B detects a jitter angle of the terminal 100, and calculates, based on the angle, a distance that needs to be compensated for by a lens module such that the lens eliminates jitter of the terminal 100 through a reverse motion, thereby implementing stabilization. The gyroscope sensor 180B may be further used for navigation and somatosensory game scenarios.

The barometric pressure sensor 180C is configured to measure barometric pressure. In some embodiments, the terminal 100 calculates an altitude using a barometric pressure value obtained by the barometric pressure sensor 180C through measurement, to assist in positioning and navigation.

The magnetic sensor 180D includes a Hall effect sensor. The terminal 100 may detect opening or closing of a flip leather case using the magnetic sensor 180D. In some embodiments, when the terminal 100 is a flip phone, the terminal 100 may detect opening or closing of a flip cover based on the magnetic sensor 180D. Further, a feature such as automatic unlocking in a case of flipping open is set based on a detected open/closed state of the leather case or the flip cover.

The acceleration sensor 180E may detect a value of an acceleration of the terminal 100 in each direction (usually on three axes). When terminal 100 is still, the acceleration sensor 180E may detect a value and a direction of gravity. The acceleration sensor 180E may be further configured to identify a terminal posture, and is applied to applications such as screen switching between landscape and portrait modes and a pedometer.

The distance sensor 180F is configured to measure a distance. The terminal 100 may measure the distance using infrared or a laser. In some embodiments, in a photographing scenario, the terminal 100 may measure a distance using the distance sensor 180F, to implement fast focusing.

The optical proximity sensor 180G may include, for example, an LED and an optical detector such as a photodiode. The light emitting diode may be an infrared light emitting diode. The terminal 100 emits infrared light using the light emitting diode. The terminal 100 detects, using the photodiode, reflected infrared light coming from a nearby object. When sufficient reflected light is detected, it may be determined that there is an object near the terminal 100. When insufficient reflected light is detected, the terminal 100 may determine that there is no object near the terminal 100. The terminal 100 may detect, using the optical proximity sensor 180G, that the terminal 100 held by the user is close to an ear for a call, to automatically turn off a screen to save power. The optical proximity sensor 180G may also be used in a leather case mode and a pocket mode for automatic unlocking and locking.

The ambient light sensor 180L is configured to sense ambient light luminance. The terminal 100 may adaptively adjust luminance of the display 194 based on the sensed ambient light luminance. The ambient light sensor 180L may also be configured to automatically adjust white balance during photographing. The ambient light sensor 180L may further cooperate with the optical proximity sensor 180G to detect whether the terminal 100 is in a pocket, thereby avoiding false touch.

The fingerprint sensor 180H is configured to collect a fingerprint. The terminal 100 may implement fingerprint unlocking, application lock access, fingerprint photographing, fingerprint-based call answering, and the like using a collected fingerprint feature.

The temperature sensor 180J is configured to detect a temperature. In some embodiments, the terminal 100 executes a temperature processing policy using the temperature detected by the temperature sensor 180J. For example, when the temperature reported by the temperature sensor 180J exceeds a threshold, the terminal 100 reduces performance of a processor near the temperature sensor 180J, to reduce power consumption and implement thermal protection. In other embodiments, when the temperature is less than another threshold, the terminal 100 heats the battery 142 to avoid abnormal shutdown of the terminal 100 that is caused by the low temperature. In other embodiments, when the temperature is less than still another threshold, the terminal 100 boosts an output voltage of the battery 142 to avoid abnormal shutdown that is caused by the low temperature.

The touch sensor 180K is also referred to as a "touch component". The touch sensor 180K may be disposed in the display 194. A touchscreen includes the touch sensor 180K and the display 194. The touch sensor 180K is configured to detect a touch operation performed on or near the touch sensor 180K. The touch sensor may transmit the detected touch operation to the application processor to determine a touch event type. Visual output related to the touch operation may be provided using the display 194. In other embodiments, alternatively, the touch sensor 180K may be disposed on a surface of the terminal 100, and is located at a position different from that of the display 194.

The bone conduction sensor 180M may obtain a vibration signal. In some embodiments, the bone conduction sensor 180M may obtain a vibration signal of a human acoustic vibration bone block. The bone conduction sensor 180M may also come into contact with a human pulse to receive a blood pressure beat signal. In some embodiments, the bone conduction sensor 180M may also be disposed in a headset to form a bone conduction headset. The audio module 170 may obtain a voice instruction through parsing based on the vibration signal that is of the acoustic vibration bone block and that is obtained by the bone conduction sensor 180M, to implement a voice function. The application processor may obtain heart rate information through parsing based on the blood pressure beat signal obtained by the bone conduction sensor 180M, to implement a heart rate detection function.

The key 190 includes a power-on key, a volume key, and the like. The key 190 may be a mechanical key, or may be a touch key. The terminal 100 may receive key input to generate key signal input related to user setting and function control of the terminal 100.

The motor 191 may generate a vibration prompt. The motor 191 may be used for a call vibration prompt, or may be used for touch vibration feedback. For example, touch operations performed on different applications (for example, photographing and audio play) may correspond to different vibration feedback effects. The motor 191 may also correspond to different vibration feedback effects when touch operations are performed on different areas of the display 194. Different application scenarios (for example, a time reminder, information receiving, an alarm clock, and a game) may also correspond to different vibration feedback effects. The touch vibration feedback effect may be further customized.

The indicator 192 may be an indicator lamp, may be configured to indicate a charging status and a power change, and may also be used to indicate a message, a missed call, a notification, and the like.

The SIM card interface 195 is configured to connect to a SIM card. The SIM card may be inserted into the SIM card interface 195 or removed from the SIM card interface 195, to implement contact with and separation from the terminal 100. The terminal 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195. The plurality of cards may be of a same type or different types. The SIM card interface 195 may also be compatible with different types of SIM cards. The SIM card interface 195 may also be compatible with an external storage card. The terminal 100 interacts with a network using the SIM card, to implement functions such as a call and data communication. In some embodiments, the terminal 100 uses an eSIM card, that is, an embedded SIM card. The eSIM card may be embedded in the terminal 100, and cannot be separated from the terminal 100. A software system of the terminal 100 may use a hierarchical architecture, an event-driven architecture, a microkernel architecture, a microservice architecture, or a cloud architecture.

An ANDROID system of the hierarchical architecture is used as an example to describe a software structure of the terminal 100.

Figure 3:
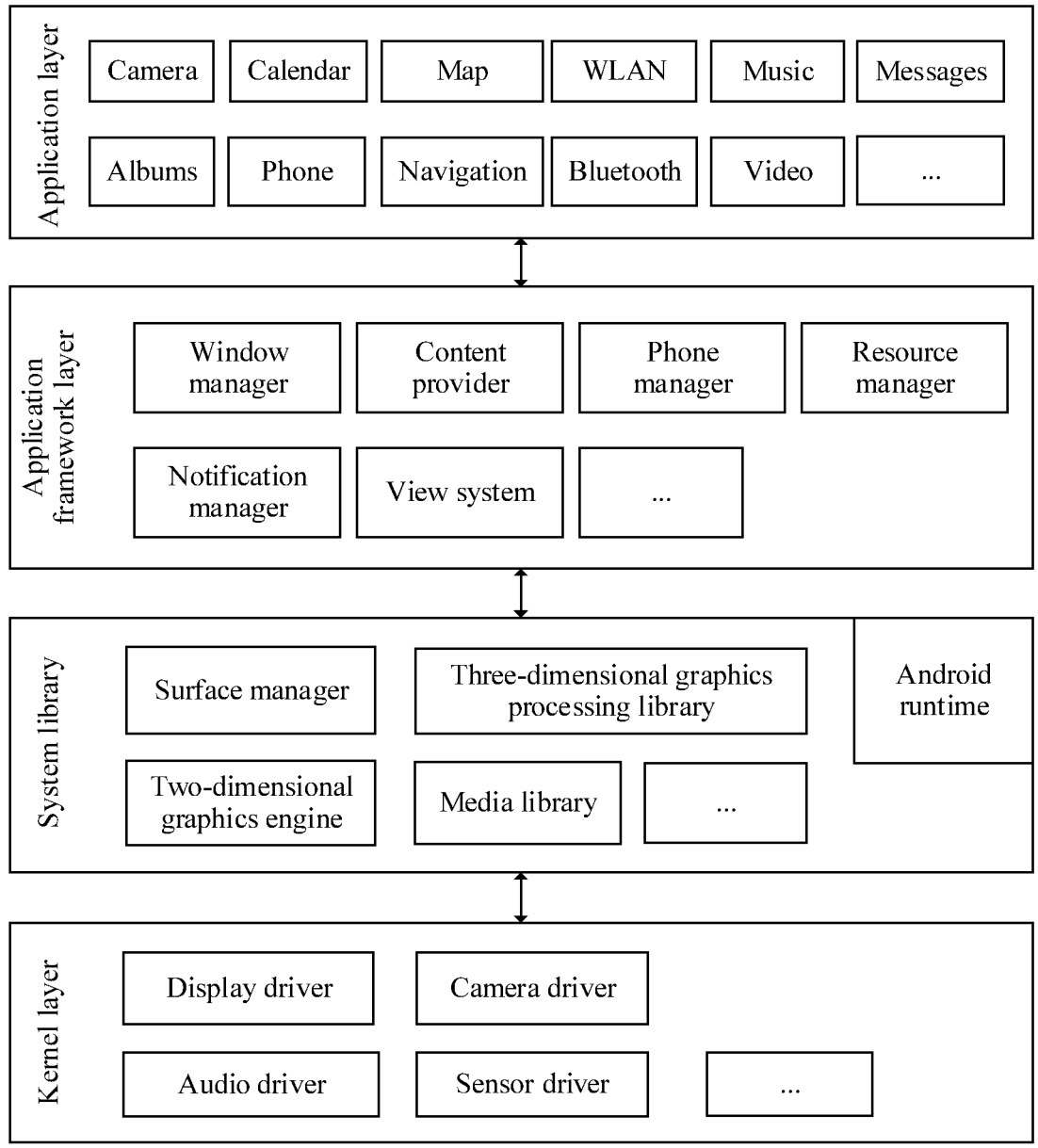
FIG. 3 is a function architecture diagram of a terminal according to an embodiment of this application.

FIG. 3 is a function architecture diagram of the terminal 100 according to an embodiment of this application.

In the hierarchical architecture, software includes some layers. Each layer has a clear role and function. The layers communicate with each other through a software interface. In some embodiments, the ANDROID system is divided into four layers from top to bottom: an application layer, an application framework layer, ANDROID runtime and a system library, and a kernel layer.

The application layer may include a series of application packages.

As shown in FIG. 3, the application packages may include applications such as camera, albums, calendar, phone, map, navigation, WLAN, BLUETOOTH, music, video, and messages.

The application framework layer provides an application programming interface (API) and a programming framework for applications at the application layer. The application framework layer includes some predefined functions.

As shown in FIG. 3, the application framework layer may include a window manager, a content provider, a view system, a phone manager, a resource manager, a notification manager, and the like.

The window manager is used to manage a window program. The window manager may obtain a screen size, determine whether there is a status bar, lock a screen, capture the screen, and the like.

The content provider is used to store and obtain data and make the data accessible to an application. The data may include a video, an image, audio, calls that are made and received, a browsing history, a bookmark, an address book, and the like.

The view system includes visual controls such as a control for displaying a text and a control for displaying a picture. The view system may be used to build an application. A display interface may include one or more views. For example, a display interface including a short message service message notification icon may include a view for displaying a text and a view for displaying a picture.

The phone manager is used to provide a communication function of the terminal 100, for example, call status management (including connection, hang-up, and the like).

The resource manager provides various resources such as a localized string, an icon, a picture, a layout file, and a video file for an application.

The notification manager enables an application to display notification information in a status bar, and may be used to convey a message of a notification type. The message may automatically disappear after a short stay without user interaction. For example, the notification manager is used to notify downloading completion, a message reminder, and the like. The notification manager may also be a notification that appears in a form of a chart or a scroll bar text in a status bar at the top of the system, for example, a notification of an application running in the background, or may be a notification that appears in a form of a dialog window on the screen. For example, text information is displayed in the status bar, an alert tone is made, the terminal vibrates, and an indicator lamp flashes.

The ANDROID runtime includes a kernel library and a virtual machine. The ANDROID runtime is responsible for scheduling and management of the ANDROID system.

The kernel library includes two parts: a functional function to be invoked by a JAVA language and an ANDROID kernel library.

The application layer and the application framework layer run in the virtual machine. The virtual machine executes Java files of the application layer and the application framework layer to obtain binary files. The virtual machine is used to perform functions such as object lifecycle management, stack management, thread management, security and abnormality management, and garbage collection.

The system library may include a plurality of function modules, for example, a surface manager, a media library, a three-dimensional (3D) graphics processing library (for example, OpenGL ES), and a two-dimensional (2D) graphics engine (for example, an SGL).

The surface manager is used to manage a display subsystem and provide fusion of 2D and 3D layers for a plurality of applications.

The media library supports playback and recording of a plurality of commonly used audio and video formats, a still image file, and the like. The media library may support a plurality of audio and video encoding formats such as MPEG-4, H.264, MP3, Advanced Audio Coding (AAC), Adaptive Multi-Rate (AMR), Joint Photographic Experts Group (JPEG), and Portable Network Graphics (PNG).

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following provides an example description of a working process of software and hardware of the terminal 100 with reference to an event detection scenario.

For example, a target event is that a touch operation is performed on an interface. A procedure of detecting a trigger operation may include that when the touch sensor 180K receives a touch operation, a corresponding hardware interrupt is sent to the kernel layer. The kernel layer processes the touch operation into an original input event (including information such as touch coordinates and a timestamp of the touch operation). The original input event is stored in the kernel layer. The application framework layer obtains the original input event from the kernel layer, and identifies a control corresponding to the input event, to detect that the touch operation occurs. For example, the touch operation is a click operation, and a control corresponding to the click operation is an icon of a music application. The music application invokes an interface of the application framework layer, to start the music application and further display an interface of the music application using the display 194.

The following provides an example description of an application scenario of the embodiments of this application.

The embodiments of this application may be applied to a scenario in which a terminal is woken up to perform voice interaction. In a related technology, each time a user expects a terminal to execute a service, the user needs to utter a wakeup word of the terminal once. According to a method provided in the following method embodiments, a wakeup word-free wakeup function can be implemented. For example, the wakeup word of the terminal is "Hello, Alice". The following provides comparative descriptions with reference to scenarios 1 to 8:

Scenario 1: During driving, the user expects the in-vehicle terminal to play a song.

In the related technology, the scenario includes the following step 1 to step 7:

Step 1: The user says "Hello, Alice".

Step 2: The in-vehicle terminal collects the voice instruction, and determines that the voice instruction includes "Hello, Alice", and in this case, the in-vehicle terminal is woken up and plays a voice "I am here" in response to the voice instruction of the user. Then, if the in-vehicle terminal has not collected a voice instruction within preset duration, the in-vehicle terminal sleeps again.

Step 3: The user turns on a radio station switch.

Step 4: The user says "Hello, Alice".

Step 5: The in-vehicle terminal collects the voice instruction, and determines that the voice instruction includes "Hello, Alice", and in this case, the in-vehicle terminal is woken up again and plays a voice "I am here" in response to the voice instruction of the user.

Step 6: The user says "Please play a song of East Radio Station".

Step 7: The in-vehicle terminal collects the voice instruction, and determines that the voice instruction includes "Hello, Alice", and in this case, the in-vehicle terminal adjusts a radio station to East Radio Station and plays a song of East Radio Station.

However, in the method provided in this embodiment, the scenario may include the following step 1 to step 4:

Step 1: The user turns on a radio station switch.

Step 2: The radio station switch sends a signal to the in-vehicle terminal, and the in-vehicle terminal determines that the turn-on operation on the radio station switch is detected, and queries a mapping relationship based on the turn-on operation on the radio station switch to learn that a target service type is music, to predict that the user has an intention of performing voice interaction on a service of the service type of music.

Step 3: The user says "Please play a song of East Radio Station".

Step 4: The in-vehicle terminal collects the voice instruction, learns that a service type corresponding to "Please play a song of East Radio Station" is music, determines that the predicted target service type is the same as the service type expressed by the user through a voice, and plays a song of East Radio Station. In addition, if content expressed by the user in step 3 is unrelated to music, the in-vehicle terminal may not respond to the content expressed by the user.

It can be learned from the foregoing description that the user may activate, by turning on the radio station switch, a wakeup wordfree voice interaction function of the in-vehicle terminal on the service of the service type of music, thereby omitting a step of frequently uttering the wakeup word by the user.

Scenario 2: During driving, the user wants to view an instant messaging message.

In the related technology, the scenario includes the following step 1 to step 7:

Step 1: An application A running on the mobile phone receives an instant messaging message.

Step 2: The user says "Hello, Alice".

Step 3: The terminal collects the voice instruction, and determines that the voice instruction includes "Hello, Alice", and in this case, the mobile phone is woken up and plays a voice "I am here" in response to the voice instruction of the user. Then, if the mobile phone has not collected a voice instruction within preset duration, the mobile phone sleeps again.

Step 4: The user says "Hello, Alice".

Step 5: The mobile phone collects the voice instruction, and determines that the voice instruction includes "Hello, Alice", and in this case, the mobile phone is woken up again and plays a voice "I am here" in response to the voice instruction of the user.

Step 6: The user says "See what the application A is saying".

Step 7: The mobile phone collects the voice instruction, and determines that the voice instruction includes "See what the application A is saying", and in this case, the mobile phone obtains the instant messaging message "Let's eat hot pot at 7:00 p.m." received by the application A, and plays a voice "Let's eat hot pot at 7:00 p.m.".

However, in the method provided in this embodiment, the scenario may include the following step 1 to step 4:

Step 1: An application A running on the mobile phone receives an instant messaging message.

Step 2: The mobile phone queries a mapping relationship based on the received instant messaging message to learn that a target service type is the application A, to predict that the user has an intention of performing voice interaction on a service of the type of the application A.

Step 3: The user says "See what the application A is saying".

Step 4: The mobile phone collects the voice instruction, and learns that a service type corresponding to "See what the application A is saying" is the application A, and in this case, the mobile phone determines that the predicted target service type is the same as the service type expressed by the user through a voice, and the mobile phone obtains the instant messaging message "Let's eat hot pot at 7:00 p.m." received by the application A, and plays a voice "Let's eat hot pot at 7:00 p.m.". In addition, if content expressed by the user in step 3 is unrelated to the application A, the mobile phone may not respond to the content expressed by the user, thereby avoiding false wakeup.

It can be learned from the foregoing description that if an instant messaging message is received, a wakeup wordfree voice interaction function of the mobile phone on a service of an instant messaging application may be activated, thereby omitting a step of frequently uttering the wakeup word by the user.

Scenario 3: When one song is to end, the user wants to continue to play another song.

In the related technology, the scenario includes the following step 1 to step 5:

Step 1: A song A currently played by an intelligent sound box is to end.

Step 2: The user says "Hello, Alice".

Step 3: The intelligent sound box collects the voice instruction, and determines that the voice instruction includes "Hello, Alice", and in this case, the intelligent sound box is woken up and plays a voice "I am here" in response to the voice instruction of the user.

Step 4: The user says "Play a song B".

Step 5: The intelligent sound box collects the voice instruction, and determines that the voice instruction includes "Play a song B", and in this case, the intelligent sound box plays the song B.

However, in the method provided in this embodiment, the scenario may include the following step 1 to step 3:

Step 1: If a song A currently played by an intelligent sound box is to end, the intelligent sound box determines that progress of a current service meets a condition, and the intelligent sound box queries a mapping relationship based on the current service, that is, music, to learn that a target service type is music, to predict that the user has an intention of performing voice interaction on a service of the service type of music.

Step 2: The user says "Play a song B".

Step 3: The intelligent sound box collects the voice instruction, and learns that a service type corresponding to "Play a song B" is music, and in this case, determines that the predicted target service type is the same as the service type expressed by the user through a voice, and plays the song B. In addition, if content expressed by the user in step 2 is unrelated to music, the intelligent sound box may not respond to the content expressed by the user.

It can be learned from the foregoing description that if a currently played song is to end, a wakeup wordfree voice interaction function of the mobile phone on a service of the service type of music may be activated, thereby omitting a step of frequently uttering the wakeup word by the user.

Scenario 4: It suddenly rains during driving.

In the related technology, the scenario includes the following step 1 to step 4:

Step 1: The user says "Hello, Alice".

Step 2: The in-vehicle terminal collects the voice instruction, and determines that the voice instruction includes "Hello, Alice", and in this case, the in-vehicle terminal is woken up and plays a voice "I am here" in response to the voice instruction of the user.

Step 3: The user says "Turn on a windshield wiper".

Step 4: The in-vehicle terminal collects the voice instruction, and determines that the voice instruction includes "Turn on a windshield wiper", and in this case, the in-vehicle terminal sends a signal to a controller of a vehicle, and the controller controls a drive circuit of the windshield wiper to drive the windshield wiper to rotate.

However, in the method provided in this embodiment, the scenario may include the following step 1 to step 3:

Step 1: The in-vehicle terminal determines, using a raindrop sensor, that raining is detected, and queries a mapping relationship based on the raining, to learn that a target service type is a windshield wiper, to predict that the user has an intention of performing voice interaction on a service of the service type of the windshield wiper.

Step 2: The user says "Turn on the windshield wiper".

Step 3: The in-vehicle terminal collects the voice instruction, learns that a service type corresponding to "Turn on the windshield wiper" is the windshield wiper, and determines that the predicted target service type is the same as the service type expressed by the user through a voice, and in this case, the in-vehicle terminal sends a signal to a controller of a vehicle, and the controller instructs a drive circuit of the windshield wiper to drive the windshield wiper to rotate. In addition, if content expressed by the user in step 2 is unrelated to the windshield wiper, the in-vehicle terminal may not respond to the content expressed by the user.

It can be learned from the foregoing description that if it rains, a wakeup word-free voice interaction function of the mobile phone on a service of the service type of the windshield wiper may be activated, thereby omitting a step of frequently uttering the wakeup word by the user.

Scenario 5: A vehicle has insufficient fuel during driving.

In the related technology, the scenario includes the following step 1 to step 4:

Step 1: The user says "Hello, Alice".

Step 2: The in-vehicle terminal collects the voice instruction, and determines that the voice instruction includes "Hello, Alice", and in this case, the mobile phone is woken up and plays a voice "I am here" in response to the voice instruction of the user.

Step 3: The user says "Where is the nearest gas station".

Step 4: The in-vehicle terminal collects the voice instruction, and determines that the voice instruction includes "Where is the nearest gas station", and in this case, the in-vehicle terminal invokes an interface of a navigation application, obtains an address of the gas station through query, and plays a voice "The address of the gas station is on a road Y in a district X".

However, in the method provided in this embodiment, the scenario may include the following step 1 to step 3:

Step 1: The in-vehicle terminal detects a fuel capacity of the vehicle, determines that the fuel capacity is less than a threshold, and queries a mapping relationship based on the fuel capacity to learn that a service type set includes a gas station and navigation, to predict that the user has an intention of performing voice interaction on services of two service types of the gas station and navigation.

Step 2: The user says "Where is the nearest gas station".

Step 3: The in-vehicle terminal collects the voice instruction, and learns that a service type corresponding to "Where is the nearest gas station" is navigation, and in this case, determines that the predicted target service type is the same as the service type expressed by the user through a voice, invokes an interface of a navigation application, obtains an address of the gas station through query, and plays a voice "The address of the gas station is on a road Y in a district X". In addition, if content expressed by the user in step 2 is unrelated to navigation, the in-vehicle terminal may not respond to the content expressed by the user.

It can be learned from the foregoing description that if the vehicle has insufficient fuel, a wakeup wordfree voice interaction function of the in-vehicle terminal on services of the two service types of the gas station and navigation may be activated, thereby omitting a step of frequently uttering the wakeup word by the user.

Scenario 6: A call is to be answered.

In the related technology, the scenario includes the following step 1 to step 5:

Step 1: The mobile phone receives a call request of a caller, and an operating system of the mobile phone pushes a call notification.

Step 2: The user says "Hello, Alice".

Step 3: The terminal collects the voice instruction, and determines that the voice instruction includes "Hello, Alice", and in this case, the mobile phone is woken up, and plays a voice "I am here".

Step 4: The user says "Accept the call for me".

Step 5: The mobile phone collects the voice instruction, and determines that the voice instruction includes "Accept the call for me", and in this case, the mobile phone accepts the call.

However, in the method provided in this embodiment, the scenario may include the following step 1 to step 3:

Step 1: The mobile phone receives a call request of a caller, an operating system of the mobile phone pushes a call notification, and the mobile phone detects the call notification, and queries a mapping relationship based on the call notification to learn that a target service type is communication, to predict that the user has an intention of performing voice interaction on a service of the service type of communication.

Step 2: The user says "Accept the call for me".

Step 3: The mobile phone collects the voice instruction, and learns, based on semantic information "Accept the call" corresponding to "Accept the call for me", that a service type corresponding to the semantic information "Accept the call" is a communication type, and in this case, determines that the predicted target service type is the same as the service type expressed by the user through a voice, and accepts the call. In addition, if content expressed by the user in step 3 is unrelated to communication, the in-vehicle terminal may not respond to the content expressed by the user.

It can be learned from the foregoing description that if the mobile phone receives a call, a wakeup wordfree voice interaction function of the mobile phone on a service of the service type of communication may be activated, thereby omitting a step of frequently uttering the wakeup word by the user.

Scenario 7: A vehicle drives to an area with poor air quality.

In the related technology, the scenario includes the following step 1 to step 4:

Step 1: The user says "Hello, Alice".

Step 2: The terminal collects the voice instruction, and determines that the voice instruction includes "Hello, Alice", and in this case, the mobile phone is woken up and plays a voice "I am here" in response to the voice instruction of the user.

Step 3: The user says "Turn on an air purifier".

Step 4: The in-vehicle terminal collects the voice instruction, and determines that the voice instruction includes "Turn on an air purifier", and in this case, the in-vehicle terminal sends a signal to a controller of the vehicle, and the controller controls the air purifier to start.

However, in the method provided in this embodiment, the scenario may include the following step 1 to step 3:

Step 1: A sensor of an air purifier detects a dust concentration, and sends the detected dust concentration to the in-vehicle terminal, and the in-vehicle terminal determines that the dust concentration exceeds a threshold, and queries a mapping relationship based on the dust concentration to learn that a target service type is the air purifier, to predict that the user has an intention of performing voice interaction on a service of the type of the air purifier.

Step 2: The user says "Turn on the air purifier".

Step 3: The in-vehicle terminal collects the voice instruction, learns that a service type corresponding to "Turn on the air purifier" is the air purifier, and determines that the predicted target service type is the same as the service type expressed by the user through a voice, and in this case, the in-vehicle terminal sends a signal to a controller of the vehicle, and the controller controls the air purifier to start. In addition, if content expressed by the user in step 2 is unrelated to the air purifier, the in-vehicle terminal may not respond to the content expressed by the user.

It can be learned from the foregoing description that if the dust concentration exceeds the threshold, a wakeup wordfree voice interaction function of the in-vehicle terminal on a service of the service type of the air purifier may be activated, thereby omitting a step of frequently uttering the wakeup word by the user.

Scene 8: During driving, a sun shield of a vehicle is being opened in half, and the user expects the sun shield not to continue to be opened.

In the related technology, the scenario includes the following step 1 to step 4:

Step 1: The user says "Hello, Alice".

Step 2: The in-vehicle terminal collects the voice instruction, and determines that the voice instruction includes "Hello, Alice", and in this case, the in-vehicle terminal is woken up and plays a voice "I am here" in response to the voice instruction of the user.

Step 3: The user says "Stop dropping the sun shield".

Step 4: The in-vehicle terminal collects the voice instruction, and determines that the voice instruction includes "Drop the sun shield", and in this case, the in-vehicle terminal sends a stop signal to a controller of the vehicle, where the stop signal is used to instruct to stop continuing to open the sun shield, and after the controller receives the stop signal, the controller controls a drive circuit of the sun shield to stop continuing to open the sun shield.

However, in the method provided in this embodiment, the scenario may include the following step 1 to step 3:

Step 1: The sun shield sends a current state to the in-vehicle terminal, and the in-vehicle terminal determines, based on the state of the sun shield, that an opening degree of the sun shield meets a condition, and queries a mapping relationship based on the sun shield to learn that a target service type is "sun shield", to predict that the user has an intention of performing voice interaction on a service of the type of "sun shield".

Step 2: The user says "Stop dropping the sun shield".

Step 3: The in-vehicle terminal collects the voice instruction, and learns, based on semantic information "Stop dropping the sun shield" corresponding to the voice instruction, that a service type corresponding to the semantic information "Stop dropping the sun shield" is the sun shield, and in this case, the in-vehicle terminal sends a stop signal to a controller of the vehicle, where the stop signal is used to instruct to stop continuing to open the sun shield, and after the controller receives the stop signal, the controller controls a drive circuit of the sun shield to stop continuing to open the sun shield. In addition, if content expressed by the user in step 2 is unrelated to the sun shield, the in-vehicle terminal may not respond to the content expressed by the user.

It can be learned from the foregoing description that if the opening degree of the sun shield meets the condition, a wakeup wordfree voice interaction function of the in-vehicle terminal on a service of the service type of the sun shield may be activated, thereby omitting a step of frequently uttering the wakeup word by the user.

The following provides an example description of a method procedure of this application.

Figure 4:
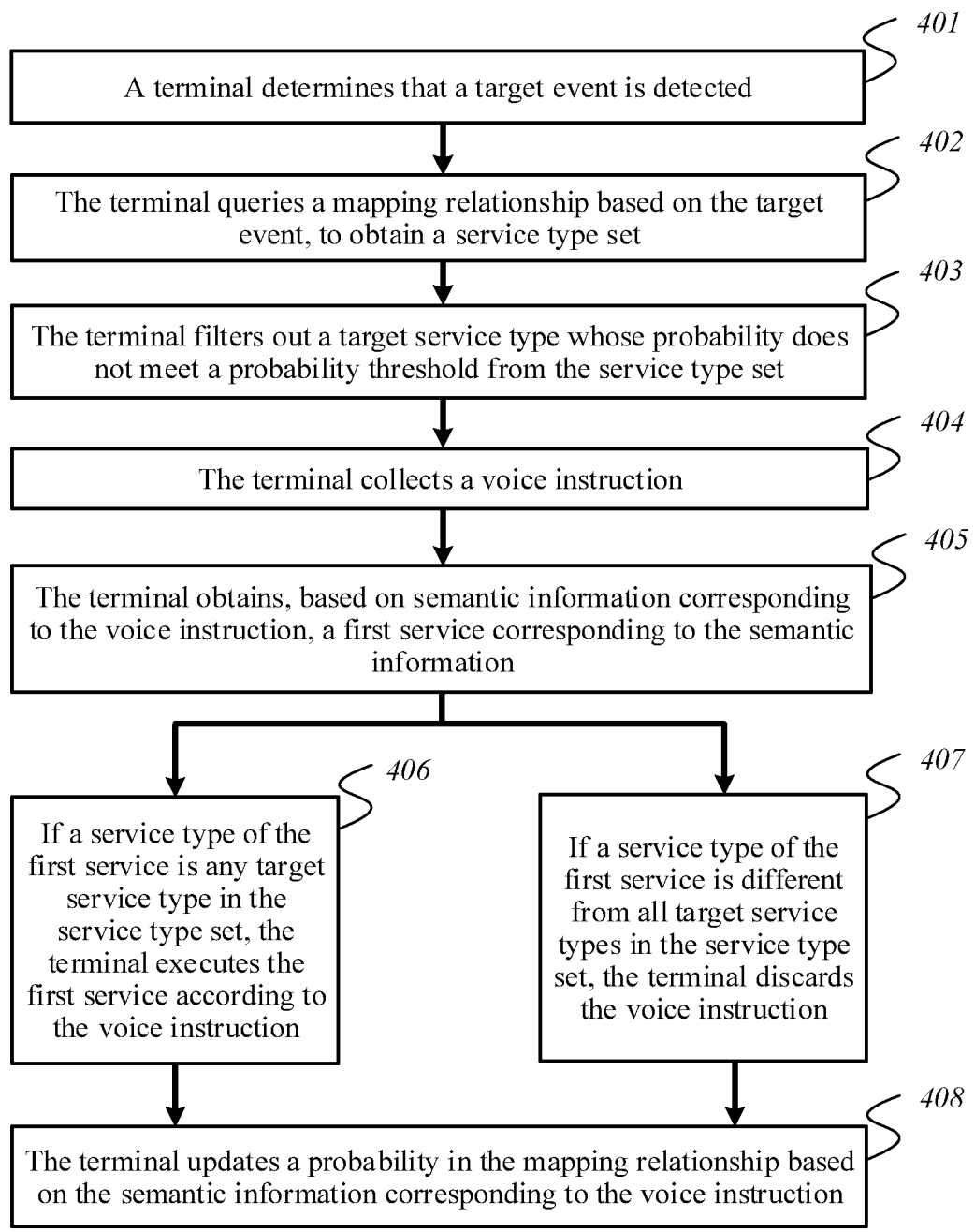
FIG. 4 is a flowchart of a voice interaction method according to an embodiment of this application.

FIG. 4 is a flowchart of a voice interaction method according to an embodiment of this application. This embodiment is described using an example in which an execution body is a terminal. Referring to FIG. 4, the method includes the following steps.

401. The terminal determines that a target event is detected.

The target event is an event that can trigger voice interaction. If the target event occurs, there is a specific probability that a user has an intention of performing voice interaction and has a requirement of waking up the terminal to perform voice interaction. In view of this, the terminal detects the target event such that when the target event is detected, the terminal determines, with reference to the target event and a voice instruction, whether to activate a voice interaction function.

Optionally, the target event may have one or more modes. The mode is a form or a dimension of the target event. For example, the mode of the target event may be an operation of the user, the mode of the target event may be a notification message, the mode of the target event may be that an environment parameter meets a first condition, or the mode of the target event may be that progress of a current service meets a second condition. Certainly, the mode of the target event may be replaced with another mode based on a service requirement. The mode of the target event is not limited in this embodiment.

The operation of the user may be but is not limited to one or more of an operation on a physical key, an operation on an interface, a voice instruction, and a browsing behavior. The physical key may be a key of the terminal, or may be a key of another device establishing a communication connection to the terminal. For example, if the terminal is an in-vehicle terminal, the physical key may be a key of any device mounted on a vehicle. For example, the physical key may be an air conditioner switch or a radio station switch of the vehicle. If the user performs an operation on the physical key, the physical key may send a signal to the terminal, and the terminal determines that the operation on the physical key is detected. The interface may be a system interface or an interface of an application of the terminal. If the user performs an operation on the interface, a screen of the interface may send a signal to the terminal, and the terminal determines that the operation on the interface is detected. The voice instruction may be collected using a microphone. The browsing behavior may be a behavior of browsing an interface of the terminal by the user. If the user has a browsing behavior, the terminal may capture a line of sight of the user using a camera, to determine that the browsing behavior is detected. The operation may be a press operation, a click operation, a slide operation, or the like. A specific type of the operation is not limited in this embodiment.

The notification message may be a message pushed by an operating system or an application. For example, the notification message may be one or more of a call notification, a short message service message, an instant messaging message, an alarm message, and a resource recommendation message. The alarm message may indicate that the terminal is faulty, for example, may indicate that power is less than 10% of total power, that a memory is insufficient, or that the terminal is attacked by a network. The alarm message may alternatively indicate that another device establishing a communication connection to the terminal is faulty. For example, an alarm message of an in-vehicle terminal may indicate that a motor of a vehicle is faulty. The resource recommendation message may indicate a resource recommended to the user, for example, may be a news recommended by a news application, a commodity or a service recommended by an e-commerce application, or a virtual article recommended by a game application.

The environment parameter may be but is not limited to one or more of noise, a temperature, humidity, luminance, a dust concentration, and a fuel capacity. The first condition may be but is not limited to a condition that the environment parameter exceeds a parameter threshold or an environment parameter change amount exceeds a change amount threshold.

For a specific process of detecting that the environment parameter meets the first condition, a sensor may collect the environment parameter in real time or periodically, and send the collected environment parameter to the terminal. For example, a temperature sensor may collect a temperature and send the temperature to the terminal, a humidity sensor may collect humidity and send the humidity to the terminal, a dust sensor may collect a dust concentration and send the dust concentration to the terminal, a luminance sensor may collect luminance and send the luminance to the terminal, the microphone may collect noise intensity and send the noise intensity to the terminal, and a fuel capacity sensor may collect a current remaining fuel capacity of a vehicle and send the fuel capacity to the terminal. The terminal may receive the environment parameter from the sensor. The terminal may determine whether the environment parameter exceeds the parameter threshold. If the environment parameter exceeds the parameter threshold, the terminal determines that the environment parameter meets the first condition. Alternatively, the terminal may obtain the environment parameter change amount based on the currently obtained environment parameter and a historically obtained environment parameter, and determine whether the environment parameter change amount exceeds the change amount threshold. If the environment parameter change amount exceeds the change amount threshold, it indicates that an environment changes, and it is determined that the environment parameter meets the first condition.

The current service may be a service currently executed by the terminal, or may be a service currently executed by another device establishing a communication connection to the terminal. For example, if the terminal is an in-vehicle terminal, the in-vehicle terminal may establish, using a controller of a vehicle, a communication connection to an air conditioner, a sun shield, or a windshield wiper mounted on the vehicle, and the current service may be a navigation service or a music service currently executed by the in-vehicle terminal, a temperature adjustment service executed by the air conditioner, a rotation service executed by the windshield wiper, or a drop service executed by the sun shield.

The second condition may be but is not limited to a change of the progress of the service. For example, the second condition may be that the progress of the service exceeds a threshold or a service progress change amount exceeds a change amount threshold. For example, the second condition may be that the service is to end or a half of the service is executed. For example, for an air conditioner, that the progress of the current service meets the second condition may be that the air conditioner starts to execute a temperature adjustment service, for example, the air conditioner starts to set a temperature or the air conditioner starts to increase an air volume, or that the progress of the current service meets the second condition may be that progress of a temperature adjustment service executed by the air conditioner changes, for example, a temperature sensor of the air conditioner detects that a temperature changes.

For a specific process of detecting that the progress of the current service meets the second condition, the terminal may obtain the progress of the current service, determine whether the progress of the current service exceeds the threshold, and if the progress of the current service exceeds the threshold, determine that the progress of the current service meets the second condition. Alternatively, the terminal may obtain a current service progress change amount based on the progress of the current service and historical progress of the current service, and determine whether the change amount exceeds the change amount threshold. If the current service progress change amount exceeds the change amount threshold, it indicates that the current service changes, and it is determined that the progress of the current service meets the second condition. The change amount and the change amount threshold may be represented by change percentages, or may be represented by change times, or certainly may be represented by data of another dimension. This is not limited in this embodiment.

It should be noted that the operation of the user, the notification message, the mode that the environment parameter meets the first condition, and the mode that the progress of the current service meets the second condition are merely examples of the target event, and the target event is not limited thereto. It should be understood that the mode of the target event may be correspondingly extended based on an actual service of the terminal, and any event that can trigger voice interaction may be provided as the target event. The target event is not limited in this embodiment.

402. The terminal queries a mapping relationship based on the target event, to obtain a service type set.

The service type set includes one or more target service types, and each target service type is a service type corresponding to a voice interaction intention. The terminal may predict the voice interaction intention of the user based on the target event, to obtain the service type set. The target service type may be a type of a service executed by the terminal, or may be a type of a service executed by another device establishing a communication connection to the terminal. For example, if the terminal is a controller of a vehicle, the target service type may be a type of a service executed by a device such as an air conditioner or a lamp mounted on the vehicle. For example, the target service type may be one or more of navigation, schedule consultation, an air conditioner, a radio station, music, vehicle control, mileage query, question and answer consultation, a game, system setting, vehicle control, charging, maintenance, and communication.

The mapping relationship may include one or more events and one or more service types. The mapping relationship may indicate a correspondence between an event and a service type. Each event in the mapping relationship may correspond to one or more service types. The event in the mapping relationship may be a first entry, a service type corresponding to the event may be a second entry, and a location of the first entry corresponds to a location of the second entry. For example, the first entry and the second entry may be located in a same row. For example, the mapping relationship may be shown in the following Table 1.

TABLE 1

| Mode of an event | Event | Service type | | |
|---|---|---|---|---|
| Operation of the user | Main switch | Navigation | Music | Schedule consultation |
| | Air conditioner switch | Air conditioner | | |
| | Radio station switch | Radio station | | |
| | System setting interface | System | | |
| | Music interface | Music | | |
| | Navigation interface | Navigation | | |
| Notification message | Low battery | Question and answer | | |
| | Motor fault | Question and answer | Maintenance | |
| | Short message service message | Short message service message | | |
| | Instant messaging message | Instant messaging application | | |
| | Call | Call | | |
| | News recommendation | News application | | |
| | Commodity recommendation | E-commerce application | | |
| Progress of a current service | Music is to end | Music | | |
| | Navigation is to end | Navigation | Communication | |
| | Open a sun shield | Sun shield | | |
| Environment parameter | Air quality | Air conditioner | Vehicle control | |
| | Light | Vehicle control | | |
| | Noise | Vehicle control | System | |

The terminal may use the target event as an index to query the mapping relationship to obtain the service type set. For example, if the detected target event is an operation on the main switch, Table 1 is queried to learn that the service type set is navigation, music, and schedule consultation. Optionally, the mapping relationship may include one or more of a first mapping relationship between an operation of the user and a service type corresponding to the operation, a second mapping relationship between a notification message and message viewing or message processing, a third mapping relationship between an environment parameter and environment parameter adjustment, and a fourth mapping relationship between a current service and a service type of the current service. The first mapping relationship may include one or more operations and service types corresponding to the one or more operations. Any operation may correspond to one or more service types. For example, the first mapping relationship may be shown in the following Table 2.

TABLE 2

| Operation of the user | Specific item | Service type | | |
|---|---|---|---|---|
| Operation on a physical key | Main switch | Navigation | Music | Schedule consultation |
| | Air conditioner switch | Air conditioner | | |
| | Radio station switch | Radio station | | |

TABLE 2-continued

| Operation of the user | Specific item | Service type | |
|---|---|---|---|
| Operation on an interface | System setting interface | Setting selection | |
| | Music interface | Music | |
| | Navigation interface | Navigation | |
| Voice instruction | Increase | Vehicle control | Music |
| | Play a song | Music | |

In some possible embodiments, the first mapping relationship may be established based on an operation consecutiveness rule. The operation consecutiveness rule means that if an operation A and an operation B are consecutive operations, if the user performs the operation A, it may be predicted that the user has an intention of performing the operation B. Consecutive operations mean that the user performs the operation B immediately after performing the operation A. For ease of description, herein, the operation A (a current operation of the user) is referred to as a first operation, and the operation B (a consecutive operation associated with the first operation) is referred to as a target second operation. The target second operation is an operation that is to be performed at a specific probability after the first operation is performed, the target second operation is a predicted operation, the target second operation may or may not be performed, and the target second operation may be an operation that is performed first after the first operation. The first mapping relationship may include a mapping relationship between the first operation and one or more service types, each service type in the first mapping relationship is a service type corresponding to the target second operation, and one or more target second operations are consecutive operations associated with the first operation. For example, referring to Table 2, turning on the main switch (the first operation) and performing navigation to a destination (the target second operation) are consecutive operations, turning on the main switch (the first operation) and clicking a song play button (the target second operation) are also consecutive operations, turning on the main switch (the first operation) and viewing today's schedule (the target second operation) are also consecutive operations, a service type of the operation of performing navigation to the destination is navigation, a service type corresponding to the operation of clicking the song play button is music, and a service type of the operation of viewing today's schedule is schedule consultation. Therefore, when the first mapping relationship is being established, the operation on the main switch may be used as the first operation, navigation, music, and schedule consultation may be used as service types corresponding to the target second operation, and the operation on the main switch, navigation, music, and schedule consultation are written into the first mapping relationship. For another example, opening the navigation interface (the first operation) and entering a navigation destination in the navigation interface (the target second operation) are consecutive operations, and a service type corresponding to the operation of entering the navigation destination is navigation. Therefore, when the first mapping relationship is being established, the operation on the main switch may be used as the first operation, navigation may be used as a service type corresponding to the target second operation, and a mapping relationship between opening the navigation interface and navigation is stored in the first mapping relationship. In this case, when the user opens the navigation interface, the terminal may predict that navigation is the target service type.

The second mapping relationship includes one or more notification messages and message viewing or message processing. Message viewing may be viewing a short message service message, viewing an instant messaging message of an instant messaging application, and viewing a push message of a resource recommendation application. Message processing may include call answering, troubleshooting, and information query. For example, the second mapping relationship may be shown in the following Table 3.

TABLE 3

| Notification message | Specific item | Service type | |
|---|---|---|---|
| Message push | Short message service message | Short message service message | |
| | Instant messaging message | Instant messaging application | |
| | Call notification | Communication | |
| Alarm message | Low battery | Mileage query | Charging station |
| | Motor fault | Question and answer consultation | Maintenance |
| Resource recommendation message | News recommendation | News application | Search |
| | Network game | Game application | Search |
| | Commodity recommendation | E-commerce application | Search |

In some possible embodiments, the second mapping relationship may be established based on a user requirement of viewing or processing a notification message. Further, if a notification message is received, it may be predicted that the user has an intention of viewing or processing the notification message. Therefore, the second mapping relationship may be a mapping relationship between the notification message and message viewing, or the second mapping relationship may be a mapping relationship between the notification message and message processing. For example, referring to Table 3, if the instant messaging application pushes an instant messaging message, it may be predicted that the user has an intention of viewing the instant messaging message, and a service type corresponding to viewing the instant messaging message may be the instant messaging application. Therefore, when the second mapping relationship is being established, the instant messaging message and an identifier of the instant messaging application may be written into the second mapping relationship.

The third mapping relationship includes one or more environment parameters and environment parameter adjustment. For example, the third mapping relationship may be shown in the following Table 4.

TABLE 4

| Environment parameter | | Service type | |
|---|---|---|---|
| Air quality | A dust concentration exceeds a threshold | Air purifier | |
| | Humidity is less than a threshold | Humidifier | |
| Light | Light meets a threshold | Vehicle control | Vehicle lamp |
| | A light change amount meets a threshold | Vehicle control | Vehicle lamp |

TABLE 4-continued

| Environment parameter | | Service type |
|---|---|---|
| Noise | Noise intensity meets a threshold | Vehicle System control control |
| Temperature | A temperature meets a threshold | Air conditioner |
| | A temperature change amount meets a threshold | Air conditioner |

In some possible embodiments, the third mapping relationship may be established based on a user requirement of responding to an environment change. Further, in consideration that when the environment parameter meets a condition, a user perception is affected, it may be predicted that the user has an intention of adjusting the environment parameter. Therefore, the third mapping relationship may include a mapping relationship between the environment parameter and a service type corresponding to environment parameter adjustment. For example, referring to Table 4, if the temperature change amount meets the threshold, it may be predicted that the user has a requirement of adjusting the temperature. Because a service type corresponding to temperature adjustment is the air conditioner, when the third mapping relationship is being established, a mapping relationship between the case in which the temperature change amount meets the threshold and the air conditioner may be stored in the third mapping relationship.

The fourth mapping relationship may include one or more current services and service types of the current services. For example, the fourth mapping relationship may be shown in the following Table 5.

TABLE 5

| Current service | Service type | Service type |
|---|---|---|
| Music is to end | Music | |
| Navigation is to end | Navigation | Communication |
| A sun shield is being opened in half | Sun shield | |

In some possible embodiments, the fourth mapping relationship may be established based on a response requirement of the user. Further, in consideration that when the progress of the current service meets a condition, a user perception is affected, it may be predicted that the user has an intention of enabling the current service again, stopping the current service, or adjusting the current service. Therefore, the fourth mapping relationship may be a mapping relationship between the current service and the service type of the current service. For example, referring to Table 5, if currently played music is to end, it may be predicted that the user has a requirement of playing a next song, stopping playing a song, or replaying a song. Because a service type corresponding to playing the next song, stopping playing the song, or replaying the song is music, when the fourth mapping relationship is being established, a mapping relationship between the case in which music is to end and music may be stored in the fourth mapping relationship.

In some possible embodiments, a process of establishing a mapping relationship may include the following Implementation 1 and Implementation 2.

Implementation 1: The terminal obtains, based on a historical record, a historical service associated with a historical target event, and writes a service type of the historical service and the historical target event into the mapping relationship.

In this implementation, the mapping relationship may be established based on a historical voice interaction process. Further, if after the terminal detects the historical target event at a historical time point, the user performs voice interaction with the terminal such that the terminal executes a historical service in response to a voice instruction of the user, the terminal may establish a mapping relationship between the historical target event and a service type of the historical service. Subsequently, after detecting the target event, the terminal can be woken up, and when a service type corresponding to a voice instruction is the same as the service type of the historical service, the terminal executes a service in response to the voice instruction.

The historical record includes the historical target event and the historical service associated with the historical target event. The historical service associated with the historical target event is a service executed after the historical target event is detected, and may be a service executed through voice interaction for the first time after the historical target event is detected. For example, if an operation triggered on a main switch was detected yesterday, and a service executed through voice interaction for the first time is performing navigation to a cell A, the historical record may include the operation triggered on the main switch and performing navigation to the cell A, and the operation triggered on the main switch and performing navigation to the cell A may be written into the mapping relationship. If the terminal currently detects the operation triggered on the main switch, the terminal may query the mapping relationship based on the operation on the main switch, to learn that a target service type in a service type set includes navigation.

Optionally, the terminal may write a service type of a recently executed historical service into the mapping relationship. Further, the terminal may obtain a historical time period based on a current time point and preset duration, obtain, based on the historical record, a historical service that is in the historical time period and that is associated with the historical target event, and write a service type of the historical service and the historical target event into the mapping relationship. The historical time period may be one day, one week, or one month before now. Further, an end point of the historical time period may be the current time point, and the preset duration may be one day, one week, or the like. In this manner, timeliness of the mapping relationship can be ensured such that the mapping relationship can better reflect a recent behavior habit of the user.

Optionally, the terminal may write a frequently executed historical service into the mapping relationship. Further, the terminal may obtain, based on the historical record, a quantity of execution times of each historical service associated with the target event. The terminal may select a historical service with a largest quantity of execution times from a plurality of historical services, and write a service type of the historical service with the largest quantity of execution times and the historical target event into the mapping relationship. Alternatively, the terminal may select a historical service whose quantity of execution times exceeds a quantity threshold, and write, into the mapping relationship, a service type corresponding to the historical service whose quantity of execution times exceeds the quantity threshold and the historical target event.

In Implementation 1, because a personal behavior mode of a same user is regular, generally, it is very likely that a voice interaction intention generated by the user after a current target event occurs is the same as or similar to a voice interaction intention generated after a historical target event occurs in the past. Therefore, it is very likely that a service to be executed after the current target event occurs is the same as or similar to an associated service to be executed after the historical target event occurs. Therefore, predicting, based on a historical record, a target service type to which a current voice interaction intention relates can improve accuracy of the target service type.

Implementation 2: The terminal invokes a machine learning model, inputs a sample target event into the machine learning model, outputs a service type, and writes the output service type and the sample target event into the mapping relationship.

The machine learning model is used to predict a service type based on an event. For example, a service type of a service associated with a current event may be predicted based on the event. In a possible implementation, model training may be performed using a plurality of sample events and a plurality of sample service types, to obtain the machine learning model. The sample event may be an event executed by a terminal of a sample user, or may be an event recorded in a historical record of the terminal. The sample service type is a service type of a service associated with the sample event. The machine learning model may be but is not limited to a neural network model.

In Implementation 2, the machine learning model can learn a mapping relationship between an event and a service type using a large quantity of samples in advance. Therefore, the machine learning model can accurately predict, based on a current target event, a target service type to which a voice interaction intention relates, to improve accuracy of the target service type.

It should be noted that the mapping relationship may be established by the terminal, or the mapping relationship may be established by another device other than the terminal, then the other device sends the established mapping relationship to the terminal, and the terminal may receive the mapping relationship, to obtain the mapping relationship. The other device may be but is not limited to the voice interaction platform 200 shown in FIG. 1. Certainly, the terminal may obtain the mapping relationship in another manner. For example, the mapping relationship may be published using a link address, and the terminal may access the link address and download the mapping relationship from the Internet. A manner in which the terminal obtains the mapping relationship is not limited in this embodiment.

With reference to a specific mode of an event, step 402 may be but is not limited to one or more of the following Case (1) to Case (4):

Case (1): The terminal queries the mapping relationship based on the first operation, to obtain the service type set. The target service type included in the service type set is a service type corresponding to one or more target second operations, and the one or more target second operations are consecutive operations associated with the first operation.

If the user performs the first operation, it may be predicted that the voice interaction intention of the user is to execute the target second operation. Therefore, the terminal may use the service type corresponding to the target second operation as the target service type. One first operation may correspond to one or more target second operations. For example, if the user triggers a confirmation operation on an air conditioner button, because generally, the user adjusts a temperature immediately after the user triggers the confirmation operation on the air conditioner button, the confirmation operation on the air conditioner button is the first operation, and temperature adjustment is the target second operation. Because a service type corresponding to temperature adjustment is an air conditioner, the terminal may learn that the air conditioner is the target service type. For another example, if the user clicks a music search option, because generally, the user enters a song name immediately after the user clicks the music search option, clicking the music search option is the first operation, and entering the song name is the target second operation. Because a service type corresponding to entering the song name is music, the terminal may learn that music is the target service type. For another example, if the user clicks a fault display option, because generally, the user searches for a troubleshooting method or diagnoses a fault based on viewed fault information immediately after the user clicks the fault display option, clicking the fault display option is the first operation, and searching for the troubleshooting method or troubleshooting the fault is the target second operation. Because a service type corresponding to searching for the troubleshooting method or troubleshooting the fault is a fault, vehicle control, or search, the terminal may learn that the fault, vehicle control, or search is the target service type.

Generally, if the user performs any operation, the user consecutively performs a next operation, and therefore an intention of performing voice interaction on a service corresponding to the next operation is generated. In this manner, a rule that operations are consecutive is fully used, to map an operation currently performed by the user to a service type corresponding to a next operation to be performed at a specific probability such that when the user performs an operation, a service type on which the user wants to perform voice interaction can be accurately predicted, thereby ensuring accuracy of the target service type.

For a specific process of obtaining the target service type in Case (1), in a possible implementation, the terminal may query the first mapping relationship based on the first operation, to obtain the service type set.

Case (2): The terminal queries the mapping relationship to obtain the service type set. The target service type included in the service type set is message viewing or message processing corresponding to the notification message.

For example, message viewing may be viewing the notification message using an application pushing the notification message. For example, if the notification message is an instant messaging message, message viewing may be viewing an instant messaging message using an instant messaging application, or if the notification message is a news recommendation message, message viewing may be viewing a news message using a news application. Alternatively, message viewing may be playing the notification message, displaying the notification message on a screen, projecting the notification message, or the like. Message processing may be performing search for the notification message, replying to the notification message, or troubleshooting a fault corresponding to the notification message.

Generally, if the terminal receives the notification message, the user has a requirement of viewing or processing the message, and therefore a voice interaction intention of viewing or processing the message is generated. In this manner, the user requirement of viewing or processing the message is taken into full consideration, to map the target event of receiving the notification message to two target service types of viewing the message and processing the message such that when the notification message is received, a service type on which the user wants to perform voice interaction can be accurately predicted, thereby ensuring accuracy of the target service type.

Further, Case (2) may include one or more of the following Case (2.1) to Case (2.3).

Case (2.1): Query the mapping relationship based on a call notification, to obtain the service type set, where the target service type included in the service type set is call answering.

Case (2.2): Query the mapping relationship based on a short message service message or an instant messaging message, to obtain the service type set, where the target service type included in the service type set is message viewing or message replying.

For example, message viewing may be converting the short message service message or the instant messaging message from a text to a voice and playing the short message service message or the instant messaging message in a voice form. For example, message replying may be obtaining, based on the short message service message or the instant messaging message, reply information corresponding to the short message service message or the instant messaging message, and sending the reply information to a user sending the short message service message or the instant messaging message, or receiving reply information entered by the user and sending the reply information to a user sending the short message service message or the instant messaging message.

Case (2.3): Query the mapping relationship based on an alarm message, to obtain the service type set, where the target service type included in the service type set is troubleshooting or information query.

Troubleshooting may be outputting a troubleshooting solution, performing maintenance, or the like. For example, if the alarm message is a low-battery message, troubleshooting may be mileage query or a charging station. If the alarm message is a motor fault message, troubleshooting may be question and answer consultation, motor maintenance, or the like. Information query may be obtaining a troubleshooting solution through query, obtaining a fault source through query, or the like.

In Case (2.1) to Case (2.3), a corresponding target service type is predicted for each notification message such that various application scenarios in which a notification message is received can be supported, thereby expanding an application scope.

For a specific process of obtaining the target service type in Case (2), in a possible implementation, the terminal may query the second mapping relationship based on the notification message, to obtain the one or more target service types.

Case (3): Query the mapping relationship based on the environment parameter, to obtain the service type set, where the target service type included in the service type set is environment parameter adjustment.

Environment parameter adjustment may be reducing a dust concentration using an air purifier, increasing humidity using a humidifier, adjusting a temperature using an air conditioner or a car window, adjusting light intensity using a sun shield or a car window, adjusting a rainfall amount using a windshield wiper, or the like.

Generally, an environment affects a user perception, and the user has a requirement of responding to the environment. For example, if an environment parameter changes, the user has a requirement of adjusting the environment parameter, and therefore a voice interaction intention of adjusting the environment parameter is generated. In this manner, the user requirement of responding to the environment is taken into full consideration, to map the target event that the environment parameter meets the first condition to a target service type of environment parameter adjustment such that when the environment parameter meets the first condition, a service type on which the user wants to perform voice interaction can be accurately predicted, thereby ensuring accuracy of the target service type.

For a specific process of obtaining the target service type in Case (3), in a possible implementation, the terminal may query the third mapping relationship based on the environment parameter, to obtain the one or more target service types.

Case (4): Query the mapping relationship based on the current service, to obtain the service type set, where the target service type included in the service type set is the service type of the current service.

The service type of the current service may be but is not limited to re-executing the current service, stopping executing the current service, or adjusting the current service. For example, if the current service is playing music, the service type of the current service may be playing other music, replaying the music, or stopping playing the music.

Generally, the progress of the current service affects a user perception, and the user has a requirement of responding to the current service. For example, if the current service is to end, the user usually wants to re-execute the current service, stop executing the current service, or adjust the current service. In this manner, a user requirement of responding to a service change is taken into full consideration, to map the target event that the progress of the current service meets the second condition to the service type of the current service such that when the progress of the current service meets the second condition, a service type on which the user wants to perform voice interaction can be accurately predicted, thereby ensuring accuracy of the target service type.

Optionally, step 402 may be replaced with the following. The terminal obtains, based on a historical record, a historical service associated with a historical target event, and determines, as the target service type, a service type corresponding to the historical service. That is, the target service type may be obtained by querying the historical record, without a need to establish the mapping relationship based on the historical record.

Optionally, step 402 may be replaced with the following. The terminal invokes a machine learning model, inputs the target event into the machine learning model, and outputs the one or more target service types. The machine learning model is used to predict the target service type based on the target event. That is, the target service type may be obtained using the machine learning model, without a need to establish the mapping relationship based on the machine learning model.

Optionally, the mapping relationship may further include a probability of each target service type, and step 402 may be replaced with the following. The terminal queries the mapping relationship based on the target event, to obtain the service type set and the probability corresponding to each target service type in the service type set.

The probability indicates a possibility of executing a service of a corresponding target service type. A higher probability indicates a higher possibility that a service of a corresponding target service type is to be executed after a corresponding event is detected. For example, if there is a mapping relationship between a target event i, a target service type j, a probability 1 corresponding to the target service type j, a target service type k, and a probability 2 corresponding to the target service type k, the mapping relationship may indicate that if it is determined that the target event i is detected, it is predicted that a service of the target service type j or the target service type k is to be executed, a probability of executing the service of the target service type j is the probability 1, and a probability of executing the service of the target service type k is the probability 2, where i is an identifier of the target event, and j and k are identifiers of the target service types.

For example, the mapping relationship may be shown in the following Table 6, where "/" in Table 6 indicates blank.

Based on Table 6, if an operation on a main switch is detected, it may be learned that the service type set is navigation, music, and schedule query. A probability corresponding to navigation is 0.6, a probability corresponding to music is 0.7, and a probability corresponding to schedule query is 0.4.

TABLE 6

| Event | Specific item | Navigation | Music | Radio station | Communication | Short message service message | WECHAT | Schedule query | News | Question and answer | Air conditioner | Vehicle control | System | Maintenance |
|---|---|---|---|---|---|---|---|---|---|---|---|---|---|---|
| Operation on a physical key | Main switch | 0.6 | 0.7 | / | / | / | / | 0.4 | / | / | / | / | / | / |
| | Air conditioner switch | / | / | / | / | / | / | / | / | / | 0.9 | / | / | / |
| Operation on a touch screen | Radio station switch | / | / | 0.8 | / | / | / | / | / | / | / | / | / | / |
| | System setting interface | / | / | / | / | / | / | / | / | / | / | / | 0.9 | / |
| | Music interface | / | 1 | / | / | / | / | / | / | / | / | / | / | / |
| | Navigation interface | 1 | / | / | / | / | / | / | / | / | / | / | / | / |
| Voice instruction | Vehicle control | / | / | / | / | / | / | / | / | / | / | 0.4 | / | / |
| | Music | / | 1 | / | / | / | / | / | / | / | / | / | / | / |
| | Navigation | 1 | / | / | / | / | / | / | / | / | / | / | / | / |
| Notification message | Low battery | / | / | / | / | / | / | / | / | 0.7 | / | / | / | / |
| | Motor fault | / | / | / | / | / | / | / | / | 0.2 | / | / | / | 0.7 |
| | Short message service message | / | / | / | / | 1 | / | / | / | / | / | / | / | / |
| | WECHAT | / | / | / | / | / | 1 | / | / | / | / | / | / | / |
| | Call | / | / | / | 1 | / | / | / | / | / | / | / | / | / |
| | News | / | / | / | / | / | / | / | 0.6 | 0.2 | / | / | / | / |
| Service change | Music is to end | / | 0.7 | / | / | / | / | / | / | / | / | / | / | / |
| | Navigation is to end | 0.2 | / | / | 0.6 | / | / | / | / | / | / | / | / | / |
| Environment change | Air quality | / | / | / | / | / | / | / | / | / | / | / | / | / |
| | Light | / | / | / | / | / | / | / | / | / | / | / | / | / |

TABLE 6-continued

| | | | | | | |
|---|---|---|---|---|---|---|
| Environment | / | / | 0.6 | 0.5 | / | / |
| change | / | / | / | 0.8 | / | / |

It should be noted that the mapping relationship shown in Table 6 may be provided as a multi-mode wakeup model. An input parameter of the multi-mode wakeup model includes a target event, and output parameters of the multi-mode wakeup model include a service type set and a probability. The multi-mode wakeup model may be used to predict the service type set based on the detected target event. The user may run the multi-mode wakeup model on the terminal or sell the multi-mode wakeup model to a third party for use.

403. The terminal filters out a target service type whose probability does not meet a probability threshold from the service type set.

For each target service type in the service type set, the terminal may compare a probability corresponding to the target service type with the probability threshold. If the probability corresponding to the target service type meets the probability threshold, the terminal selects the target service type, and if a service type of a first service corresponding to a subsequently collected voice instruction is the target service type, the terminal executes the first service. If the probability corresponding to the target service type does not meet a probability threshold, the terminal filters out the target service type, and subsequently does not execute a service of the target service type.

In a possible implementation, a same probability threshold may be preset for all target service types, and the probability threshold is prestored in the terminal. In this case, the terminal may compare a probability corresponding to each target service type with the same probability threshold. In another possible implementation, a corresponding probability threshold may be set for each target service type, and the probability threshold corresponding to each target service type is written into a mapping relationship. In this case, the terminal may query the mapping relationship to obtain the probability threshold corresponding to each target service type, and compare a probability corresponding to each target service type with the corresponding probability threshold. Probability thresholds corresponding to different service types may be the same or different. This is not limited in this embodiment.

For example, the mapping relationship may include the following Table 7. If the service type set is navigation, music, and schedule consultation, according to Table 6, the probability corresponding to navigation is 0.6, the probability corresponding to music is 0.7, and the probability corresponding to schedule consultation is 0.4. According to Table 7, it may be learned that a probability threshold corresponding to navigation is 0.5, a probability threshold corresponding to music is 0.5, and a probability threshold corresponding to schedule consultation is 0.5. The probability 0.6 of navigation is greater than the probability threshold 0.5, the probability 0.7 of music is greater than the probability threshold 0.5, and the probability 0.4 of schedule consultation is less than the probability threshold 0.5. Therefore, navigation and music are selected, and schedule consultation is filtered out.

TABLE 7

| Target service type | Probability threshold |
|---|---|
| Navigation | 0.5 |
| Music | 0.5 |
| Radio station | 0.5 |
| Communication | 0.7 |
| Short message service message | 0.7 |
| WECHAT | 0.7 |
| Schedule consultation | 0.5 |
| News | 0.4 |
| Question and answer | 0.4 |
| Air conditioner | 0.4 |
| Vehicle control | 0.8 |
| System | 0.7 |
| Maintenance | 0.5 |

If a probability of a target service type does not meet a probability threshold, it indicates that there is a relatively low possibility that the target service type is a service type to which the voice interaction intention of the user relates. If a service of the target service type is subsequently processed, a probability of false wakeup is relatively high. False wakeup causes interference to the user and extremely heavy load on the terminal. Therefore, the target service type is filtered out such that the terminal subsequently does not respond to a voice instruction whose semantic information is a service of the target service type, thereby reducing the probability of false wakeup and avoiding interference caused to the user and load caused to the terminal due to false wakeup.

It should be noted that step 403 is an optional step instead of a mandatory step. In some possible embodiments, after the one or more target service types are obtained, the following steps may be performed based on all the obtained target service types.

404. The terminal collects a voice instruction.

In some possible embodiments, the terminal may start monitoring when determining that the target event is detected, and end monitoring after monitoring duration. During monitoring, if the user utters a voice, the terminal may collect a voice instruction using a microphone. A time period between starting monitoring and ending monitoring may be referred to as a receiving window, and the monitoring duration may be set based on an experiment, experience, or a requirement, and may be prestored in the terminal. Optionally, same monitoring duration may be set for all service types, or different monitoring duration may be set for different service types. A mapping relationship between a service type and monitoring duration is stored in the terminal. This is not limited in this embodiment.

405. The terminal obtains, based on semantic information corresponding to the voice instruction, a first service corresponding to the semantic information.

In some possible embodiments, the terminal may perform speech recognition (automatic speech recognition (ASR)) on the voice instruction to obtain text information, perform semantic recognition on the text information to obtain the semantic information, and obtain the first service through query based on the semantic information. For example, if the semantic information is "Alice, please plan a route to a building YY of a cell XX", the first service is "Perform navigation to the building YY of the cell XX", or if the semantic information is "Alice, please play a song ZZ", the first service is "Play the song ZZ".

406. If a service type of the first service is any target service type in the service type set, the terminal executes the first service according to the voice instruction.

The terminal may compare the service type of the first service with each target service type in the service type set. If the service type of the first service is the same as any target service type, it indicates that the service type expressed by the user through a voice falls within a predicted service type range, the terminal correctly predicts the service type, and the user truly has a voice interaction intention. Therefore, the terminal is successfully woken up, activates a voice interaction function in response to the voice instruction, and executes the first service according to the voice instruction, that is, executes the service expressed by the voice instruction. For example, if the service type set is navigation and music, and the first service is "Perform navigation to the building YY of the cell XX", the service type of the first service is navigation, the service type of the first service is the same as the target service type of navigation in the service type set, and the terminal performs navigation to the building YY of the cell XX.

407. If a service type of the first service is different from all target service types in the service type set, the terminal discards the voice instruction.

If the service type set does not include the service type of the first service, it indicates that the service type expressed by the user through a voice falls beyond a predicted service type range, the terminal incorrectly predicts the service type, and the user has no voice interaction intention. Therefore, the terminal may not respond to the voice instruction, but discard the voice instruction, to avoid false wakeup caused by service processing according to the voice instruction, and save buffer space occupied by the voice instruction. For example, if the service type set is navigation and music, and the first service is "Turn on an air conditioner", the service type of the first service is the air conditioner, the service type of the first service is different from all target service types in the service type set, and the terminal does not respond to the voice instruction, that is, does not turn on the air conditioner.

In addition, the terminal may start timing when detecting the target event. If recorded duration reaches preset duration and the terminal has not received a voice instruction, the terminal stops monitoring.

It should be noted that step 407 is an optional step instead of a mandatory step.

408. The terminal updates a probability in the mapping relationship based on the semantic information corresponding to the voice instruction.

In this optional manner, each time the target event occurs, the probability may be dynamically adjusted based on semantic information currently expressed by the user such that the probability is constantly corrected through iteration in a self-learning manner by evaluating correctness of a predicted target service type, and the mapping relationship can be constantly optimized based on occurrence of the target event and semantics expressed by the user, and gradually better match a personal behavior habit of the user, thereby ensuring a more accurate mapping relationship.

Further, an update manner may include one or more of the following Manner (1) to Manner (3).

Manner 1: If the service type of the first service is any target service type in the service type set, increase a probability corresponding to the service type of the first service in the mapping relationship.

For example, if after it is determined that an operation on a main switch is detected, the service type set is navigation and music, and the service type of the first service is navigation, the terminal increases a probability corresponding to navigation.

If each time a target event X is detected, the user requires, through a voice, a service of a target service type Y to be executed, it indicates that the target service type Y is exactly a service type on which the user has a voice interaction intention after the target event X occurs. In this optional manner, a probability of the target service type Y increases constantly. Therefore, when the target event is detected again subsequently, the probability of the target service type Y meets a probability threshold such that the target service type Y is selected, and if the first service corresponding to the semantic information corresponding to the voice instruction is a service of the target service type Y, the terminal executes the service of the target service type Y in response to the voice instruction.

It should be noted that if the service type of the first service is different from all target service types in the service type set, the terminal may write the service type of the first service into the mapping relationship. Further, if the mapping relationship does not include the target event, or the mapping relationship does not include the service type of the first service, or the target event in the mapping relationship does not correspond to the service type of the first service, in any one of the three cases, the terminal may write the target event and the service type of the first service into the mapping relationship such that the target event and the service type of the first service are newly added to the mapping relationship.

In this optional manner, when the target event is detected next time, the mapping relationship may be queried to obtain the service type of the first service, and the service type of the first service may be determined as the target service type. Therefore, in a historical running process of the terminal, if each time an event X is detected, the user expresses, through a voice, an intention of performing voice interaction on a service type Y, the event X and the service type Y may be written into the mapping relationship such that the event X and the service type Y are newly added to the mapping relationship. In this way, as the voice interaction process proceeds, an association between an event and a service type can be found, and the mapping relationship can be supplemented and improved. In addition, as services expand, the terminal can add a newly added event and a newly added service type to the mapping relationship such that extensibility and timeliness of the mapping relationship can be improved.

In addition, optionally, the probability corresponding to the service type of the first service may be generated, and the generated probability is written into the mapping relationship. Further, the probability may be determined based on a quantity of times of detecting the target event and a quantity of times the semantic information of the voice instruction indicates the service type of the first service. For example, if the target event A is detected for A times, and the semantic information indicates the service type of the first service for B times, a ratio of A to B may be obtained and used as the probability. For example, if an event X is detected for ten times, and the user expresses, through a voice for seven times, an intention of performing voice interaction on a service type Y, a probability $7/10$, that is, 0.7 corresponding to the service type Y may be obtained, and the service type Y and the probability 0.7 are written into the mapping relationship. Certainly, a default probability may be used as the probability corresponding to the service type of the first service, and the service type of the first service and the default probability are written into the mapping relationship. Subsequently, the default probability is adjusted through the process shown in step 408.

Manner (2): If the service type of the first service is different from all target service types in the service type set, decrease the probability corresponding to each target service type in the service type set in the mapping relationship.

For example, if after it is determined that an operation on a main switch is detected, the service type set is navigation and music, and the service type of the first service is an air conditioner, the terminal decreases probabilities corresponding to navigation and music.

If a target event X corresponds to a target service type Y, and each time the target event X is detected, the user does not require, through a voice, a service of the target service type Y to be executed, it indicates that the target service type Y is not a service type on which the user has a voice interaction intention after the target event X occurs. In this optional manner, a probability of the target service type Y decreases constantly. Therefore, when the target event X is detected again subsequently, the probability of the target service type Y does not meet a probability threshold such that the target service type Y is filtered out, and the terminal does not process the service of the target service type Y, thereby avoiding false wakeup.

Manner (3): If the semantic information includes a wakeup word, increase a probability corresponding to the service type of the first service in the mapping relationship.

For example, if after it is determined that an operation on a main switch is detected, semantic information is "Hello, Alice, perform navigation to a destination, that is, a specific building of a specific cell", the terminal increases a probability corresponding to navigation.

If a target event X corresponds to a target service type Y, and each time the target event X is detected, the user utters the wakeup word, it indicates that the target service type Y is exactly a service type on which the user has a voice interaction intention after the target event X occurs. In this optional manner, a probability of the target service type Y increases constantly. Therefore, when the target event is detected again subsequently, the probability of the target service type Y meets a probability threshold such that the target service type Y is selected, and if a voice instruction expresses semantic information of the target service type Y, the terminal processes a service in response to the voice instruction.

It should be noted that step 408 is an optional step instead of a mandatory step.

This embodiment provides a method for triggering wakeup wordfree voice interaction. The service type set on which the user has a voice interaction intention is predicted based on the target event that can trigger voice interaction. If the service type of the first service expressed by the voice instruction is the predicted target service type, the first service is executed. A cumbersome operation that the user needs to frequently utter a wakeup word in a voice interaction process is omitted such that a problem of extremely low voice interaction efficiency caused by frequently uttering the wakeup word is resolved, an operation is more convenient, and the voice interaction process is more natural and personalized, thereby improving user experience of voice interaction. In addition, there can be target events of a plurality of modes, and a target event of any mode can trigger a voice interaction function of a corresponding service type such that a wakeup wordfree wakeup function can be supported in a plurality of application scenarios, thereby expanding an application scope.

With reference to the foregoing method embodiments, the following provides an example description of a specific software architecture in this application.

Figure 5:
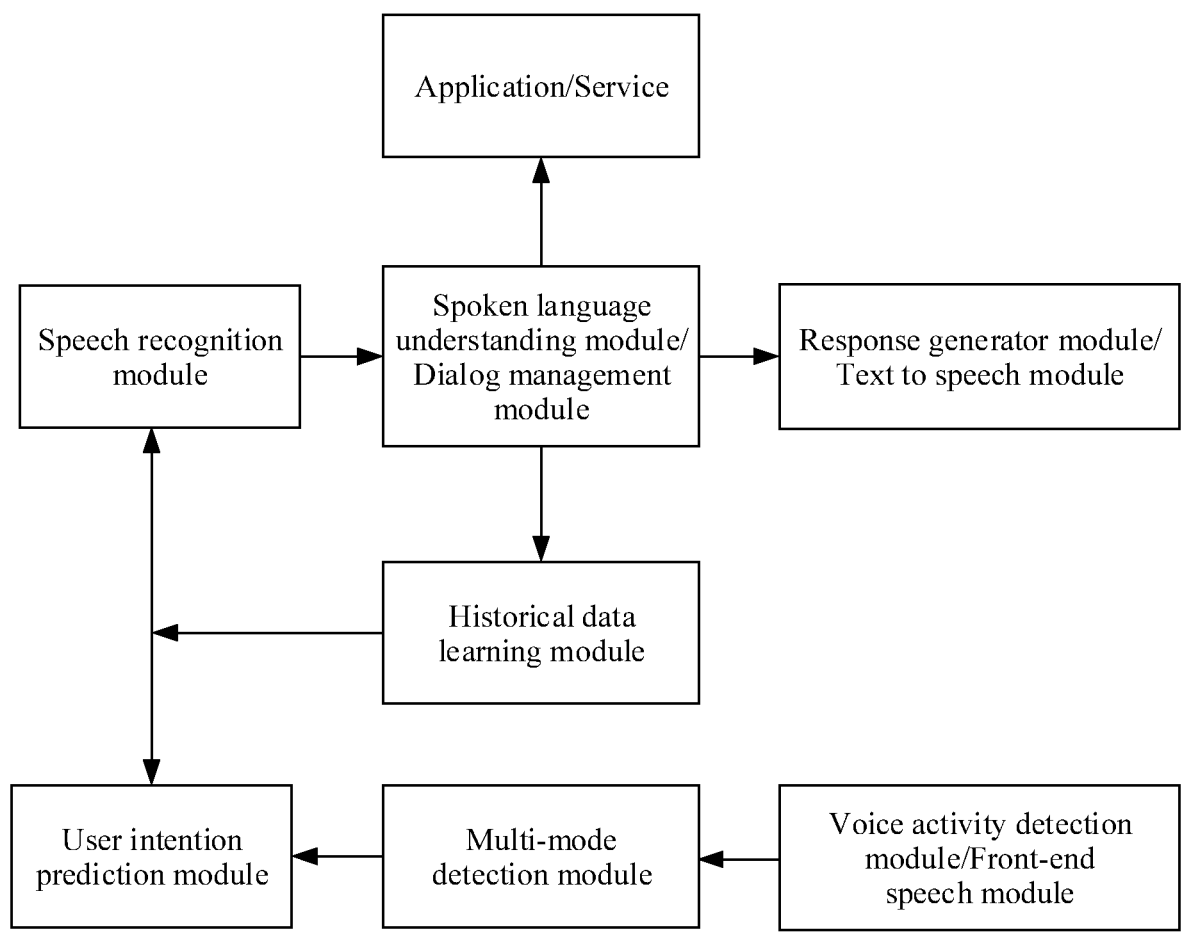
FIG. 5 is a software architecture diagram of a voice interaction system according to an embodiment of this application.

FIG. 5 is a software architecture diagram of a voice interaction system according to an embodiment of this application. The system includes the following function modules: a voice activity detection (VAD) module or a front-end speech module, a speech recognition (ASR) module, a multi-mode detection module, a user intention prediction module, a spoken language understanding (SLU) module or a dialog management (DM) module, a historical data learning module, and a response generator (RG)/text to speech (TTS) module, and each module may be a software module.

The VAD module or the front-end speech module is configured to collect an audio signal, perform denoising processing and enhancement processing on the collected audio signal, detect whether the audio signal is a voice instruction or a non-voice instruction, and if the audio signal is a voice instruction, input the voice instruction into the ASR module. The non-voice instruction may be a noise signal, a music signal, or the like.

The ASR module is configured to receive the voice instruction from the VAD module or the front-end speech module, convert the voice instruction into text information, and input the text information into the SLU module or the dialog management module.

The multi-mode detection module is configured to detect a target event, and if the target event is detected, input the target event into the user intention prediction module. For example, the multi-mode detection module may receive a notification message pushed by an operating system or an application, for example, a short message service message, a call, a recommendation message of an application, or an alarm message, or the multi-mode detection module is configured to detect operations of one or more modes, for example, an operation on a physical key or an interface or a voice instruction, or the multi-mode detection module is configured to detect an environment change or a service change, for example, a temperature decreases, an air pollution level exceeds a standard, or music is to end.

The user intention prediction module is configured to receive the target event from the multi-mode detection module, predict a voice interaction intention of a user in consideration of a user operation consecutiveness rule, a user requirement of viewing, processing, or replying, and impact of an environment or a service on a user perception, and output a service type set and a probability corresponding to each target service type in the service type set.

The SLU module or the DM module is configured to identify a user intention based on the text information of the speech recognition module, convert the user intention into a system operation, obtain reply content of a dialog based on a context status of the dialog, and output the reply content to the RG module or the TTS module.

The historical data learning module is configured to perform iterative update on the data in the user intention prediction module based on historical operation data of the user.

The RG module/TTS module is configured to convert the reply content received from the dialog management module into text information, and output the text information, or convert the reply content into a voice instruction and play a voice.

Figure 6:
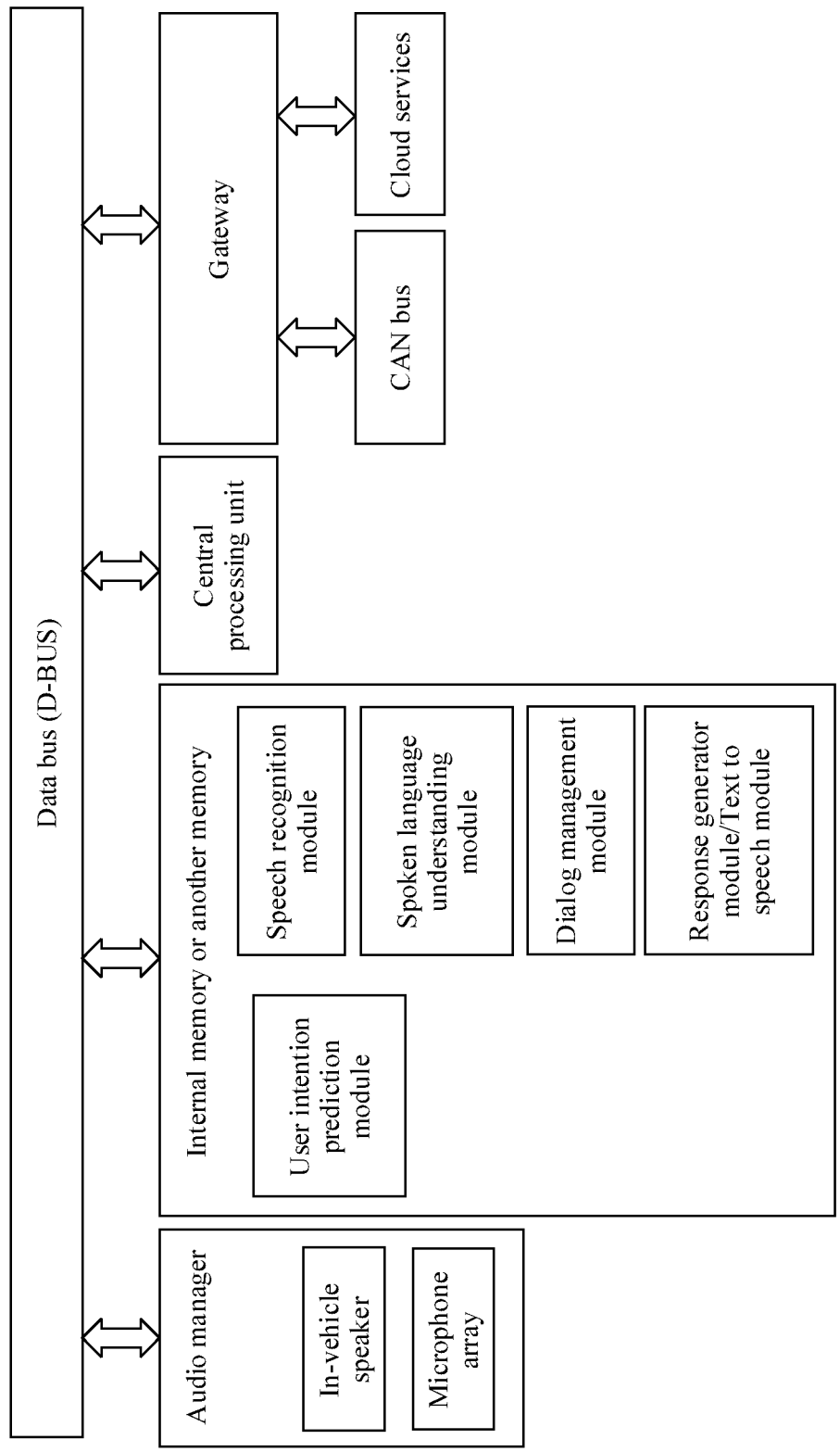
FIG. 6 is a schematic structural diagram of an in-vehicle terminal according to an embodiment of this application.

With reference to the system architecture shown in FIG. 5, in an example in which a terminal is an in-vehicle terminal, the in-vehicle terminal may be implemented using a combination of hardware and software. A structure of the in-vehicle terminal may be shown in FIG. 6, and the in-vehicle terminal includes a central processing unit (CPU), an internal memory or another memory, a data bus (D-BUS), an audio manager, a gateway, a Controller Area Network (CAN) bus, and a cloud service management module.

The CPU is configured to access each function module in the internal memory or another memory, and run each function module, and in addition, may access the memory and the audio manager through the data bus. In addition, the CPU may access various cloud services and the cloud service management module through a network interface. The CPU may further access the CAN bus using the gateway, to read data of a vehicle and various devices mounted on the vehicle, and control the vehicle and the various devices mounted on the vehicle The memory includes the internal memory and a magnetic disk memory, and stored content includes the function modules shown in FIG. 5.

The audio manager is configured to manage an in-vehicle speaker, a microphone array, or another audio device.

The foregoing describes the voice interaction method in the embodiments of this application. The following describes a voice interaction apparatus provided in the embodiments of this application. It should be understood that the voice interaction apparatus has any function of the terminal in the foregoing voice interaction method.

Figure 7:
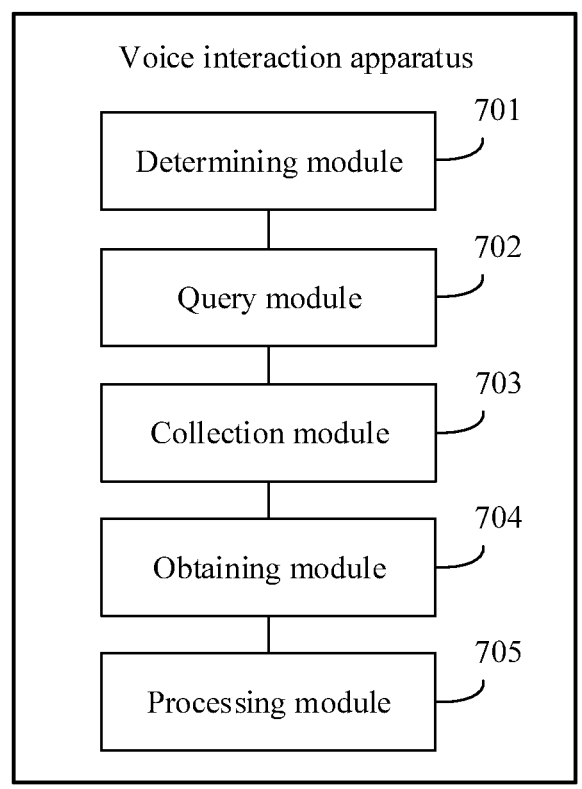
FIG. 7 is a schematic structural diagram of a voice interaction apparatus according to an embodiment of this application.

FIG. 7 is a schematic structural diagram of a voice interaction apparatus according to an embodiment of this application. As shown in FIG. 7, the apparatus includes a determining module 701 configured to perform step 401, a query module 702 configured to perform step 402, a collection module 703 configured to perform step 404, an obtaining module 704, further configured to perform step 405, and a processing module 705 configured to perform step 406.

Optionally, the determining module 701 is configured to determine that a first operation of a user is detected, and the query module 702 is configured to perform case (1) in step 402.

Optionally, the determining module 701 is configured to receive a notification message from an operating system or an application, and the query module 702 is configured to perform case (2) in step 402.

Optionally, the determining module 701 is configured to determine that a current environment parameter meets a first condition, and the query module 702 is configured to perform case (3) in step 402.

Optionally, the determining module 701 is configured to determine that progress of a current service meets a second condition, and the query module 702 is configured to perform case (4) in step 402.

Optionally, the apparatus further includes a writing module configured to, if a service type of the first service is different from all target service types in the service type set, write the service type of the first service into the mapping relationship.

Optionally, the query module 702 is further configured to query the mapping relationship based on the target event, to obtain the service type set and a probability corresponding to each target service type in the service type set.

The apparatus further includes a filtering module configured to perform step 408.

Optionally, the apparatus further includes an updating module configured to perform step 408.

Optionally, the updating module is further configured to perform one or more of manner (1) to manner (3) in step 408.

Optionally, the apparatus further includes a discarding module configured to perform step 407.

It should be noted that the voice interaction apparatus provided in the foregoing embodiments is described only using division of the foregoing function modules during voice interaction. In practice, the functions may be allocated to different function modules for implementation as required. To be specific, an internal structure of the terminal is divided into different function modules to implement all or some of the functions described above. In addition, the voice interaction apparatus provided in the foregoing embodiment and the embodiment of the voice interaction method belong to a same concept. For a specific implementation process, refer to the method embodiment. Details are not described herein again.

All the foregoing optional technical solutions may be randomly combined to form optional embodiments of this application, and details are not described herein.

An example embodiment further provides a computer-readable storage medium such as a memory including an instruction. The instruction may be executed by a processor of a terminal to complete the voice interaction method in the foregoing embodiments. The computer-readable storage medium may be non-transient. For example, the computer-readable storage medium may be a read-only memory (ROM), a RAM, a compact disc (CD) ROM (CD-ROM), a magnetic tape, a floppy disk, or an optical data storage device.

An example embodiment further provides a computer program product. The computer program product includes computer program code, and when the computer program code runs on a terminal, the terminal performs the voice interaction method in the foregoing embodiments.

An example embodiment provides a chip. The chip includes a processor configured to invoke, from a memory, an instruction stored in the memory and run the instruction such that a device on which the chip is installed performs the voice interaction method in the foregoing embodiments.

An example embodiment provides another chip. The chip includes an input interface, an output interface, a processor, and a memory, the input interface, the output interface, the processor, and the memory are connected through an internal connection path, the processor is configured to execute code in the memory, and when the code is executed, the processor is configured to perform the voice interaction method in the foregoing embodiments.

All or some of the foregoing embodiments may be implemented using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive).

The term "and/or" in this application describes only an association relationship between associated objects and represents that three relationships may exist. For example, A and/or B may represent the following three cases: only A exists, both A and B exist, and only B exists. In addition, the character "/" in this application generally indicates an "or" relationship between the associated objects.

In this application, the term "a plurality of" means two or more. For example, a plurality of data packets mean two or more data packets.

Terms such as "first" and "second" in this application are used to distinguish between same items or similar items with basically same functions or purposes. A person skilled in the art may understand that the terms such as "first" and "second" do not limit a quantity and an execution sequence.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A voice interaction method, comprising:
   detecting a target event that can trigger a voice interaction;
   querying, based on the target event, a mapping relationship to obtain a service type set and a first probability corresponding to a first target service type, wherein the first probability indicates a possibility of executing a first service corresponding to the first target service type;
   collecting a voice instruction comprising semantic information;
   obtaining, based on the semantic information, a second service corresponding to the semantic information;
   executing the second service according to the voice instruction when a first service type of the second service is the first target service type;
   filtering out, from the service type set, a second target service type comprising a second probability that does not meet a probability threshold before executing the second service and when the first service type is the first target service type;
   updating, based on the semantic information, a third probability in the mapping relationship;
   increasing a fourth probability corresponding to the first service type in the mapping relationship when the first service type is the first target service type;
   decreasing the first probability when the first service type is different from the first target service type; and
   increasing the fourth probability when the semantic information comprises a wakeup word.

2. The voice interaction method of claim 1, further comprising:
   detecting a first operation of a user; and
   querying, based on the first operation, the mapping relationship to obtain the service type set, wherein the first target service type corresponds to a plurality of target operations associated with the first operation, and wherein the target operations are consecutive operations.

3. The voice interaction method of claim 1, further comprising:
   receiving a notification message from an operating system or an application; and
   querying, based on the notification message, the mapping relationship to obtain the service type set, wherein the first target service type comprises a message viewing or a message processing corresponding to the notification message.

4. The voice interaction method of claim 3, wherein the notification message comprises at least one of a call notification, a short message service message, an instant messaging message, or an alarm message, and wherein the voice interaction method further comprises at least one of:
   querying, based on the call notification, the mapping relationship to obtain the service type set, wherein the first target service type comprises a call answering;
   querying, based on the short message service message or the instant messaging message, the mapping relationship to obtain the service type set, wherein the first target service type comprises the message viewing or a message replying; or
   querying, based on the alarm message, the mapping relationship to obtain the service type set, wherein the first target service type comprises a troubleshooting or an information query.

5. The voice interaction method of claim 1, further comprising:
   determining that a current environment parameter meets a first condition; and
   querying, based on the current environment parameter, the mapping relationship to obtain the service type set, wherein the first target service type comprises an environment parameter adjustment.

6. The voice interaction method of claim 1, further comprising:
   determining that a progress of a current service meets a second condition; and
   querying, based on the current service, the mapping relationship to obtain the service type set, wherein the first target service type comprises a second service type of the current service.

7. The voice interaction method of claim 1, further comprising:
   obtaining, based on a historical record, a historical service associated with a historical target event;
   writing a third service type of the historical service and the historical target event into the mapping relationship;
   invoking a machine learning model by inputting a sample target event into the machine learning model to predict an output service type; and
   writing the output service type and the sample target event into the mapping relationship.

8. The voice interaction method of claim 1, wherein after obtaining the second service, the voice interaction method further comprises:
identifying that the first service type is different from the first target service type; and
writing, in response to the identifying, the first service type into the mapping relationship.

9. The voice interaction method of claim 1, wherein after obtaining the second service, the voice interaction method further comprises:
identifying that the first service type is different from the first target service type; and
discarding, in response to the identifying, the voice instruction.

10. A voice interaction apparatus comprising:
a memory configured to store instructions; and
a processor coupled to the memory, wherein the instructions cause the processor to be configured to:
detect a target event that can trigger a voice interaction;
query, based on the target event, a mapping relationship to obtain a service type set and a first probability corresponding to a first target service type, wherein the first probability indicates a possibility of executing a first service corresponding to the first target service type;
collect a voice instruction comprising semantic information;
obtain, based on the semantic information, a second service corresponding to the semantic information;
execute the second service according to the voice instruction when a first service type of the second service is the first target service type;
filter out, from the service type set, a second target service type comprising a second probability that does not meet a probability threshold before executing the second service and when the first service type is the first target service type;
update, based on the semantic information, a third probability in the mapping relationship;
increase a fourth probability corresponding to the first service type in the mapping relationship when the first service type is the first target service type;
decrease the first probability when the first service type is different from the first target service type; and
increase the fourth probability when the semantic information comprises a wakeup word.

11. The voice interaction apparatus of claim 10, wherein the instructions further cause the processor to be configured to:
detect a first operation of a user; and
query, based on the first operation, the mapping relationship to obtain the service type set, wherein the first target service type corresponds to a plurality of target operations associated with the first operation, and wherein the target operations are consecutive operations.

12. The voice interaction apparatus of claim 10, wherein the instructions further cause the processor to be configured to:
receive a notification message from an operating system or an application; and
query, based on the notification message, the mapping relationship to obtain the service type set, wherein the first target service type comprises a message viewing or a message processing corresponding to the notification message.

13. The voice interaction apparatus of claim 12, wherein the notification message comprises at least one of a call notification, a short message service message, an instant messaging message, or an alarm message, and wherein the instructions further cause the processor to be configured to at least one of:
query, based on the call notification, the mapping relationship to obtain the service type set, wherein the first target service type comprises a call answering;
query, based on the short message service message or the instant messaging message, the mapping relationship to obtain the service type set, wherein the first target service type comprises the message viewing or a message replying; or
query, based on the alarm message, the mapping relationship to obtain the service type set, wherein the first target service type comprises a troubleshooting or an information query.

14. The voice interaction apparatus of claim 10, wherein the instructions further cause the processor to be configured to:
determine that a current environment parameter meets a first condition; and
query, based on the current environment parameter, the mapping relationship to obtain the service type set, wherein the first target service type comprises an environment parameter adjustment.

15. The voice interaction apparatus of claim 10, wherein the instructions further cause the processor to be configured to:
determine that a progress of a current service meets a second condition; and
query, based on the current service, the mapping relationship to obtain the service type set, wherein the first target service type comprises a second service type of the current service.

16. The voice interaction apparatus of claim 10, wherein the instructions further cause the processor to be configured to:
obtain, based on a historical record, a historical service associated with a historical target event;
write a third service type of the historical service and the historical target event into the mapping relationship;
invoke a machine learning model by inputting a sample target event into the machine learning model to predict an output service type; and
write the output service type and the sample target event into the mapping relationship.

17. The voice interaction apparatus of claim 10, wherein the instructions further cause the processor to be configured to:
identify that the first service type is different from the first target service type; and
write, in response to the identifying, the first service type into the mapping relationship.

18. The voice interaction apparatus of claim 10, wherein the instructions further cause the processor to be configured to:
identify that the first service type is different from the first target service type; and
discard, in response to the identifying, the voice instruction.

19. A terminal comprising:
a memory configured to store instructions; and
a processor coupled to the memory, wherein the instructions cause the processor to be configured to:

detect an operation of a user that can trigger a voice interaction;
query, based on the operation, a mapping relationship to obtain a service type set and a first probability corresponding to a first target service type, wherein the first probability indicates a possibility of executing a first service corresponding to the first target service type;
collect a voice instruction comprising semantic information;
obtain, based on the semantic information, a second service corresponding to the semantic information;
execute the second service according to the voice instruction when a first service type of the second service is the first target service type;
filter out, from the service type set, a second target service type comprising a second probability that does not meet a probability threshold before executing the second service and when the first service type is the first target service type;
update, based on the semantic information, a third probability in the mapping relationship;
increase a fourth probability corresponding to the first service type in the mapping relationship when the first service type is the first target service type;
decrease the first probability when the first service type is different from the first target service type; and
increase the fourth probability when the semantic information comprises a wakeup word.

20. The terminal of claim 19, wherein the instructions cause the processor to be configured to:
receive a notification message from an operating system or an application, wherein the notification message comprises a call notification; and
query, based on the call notification, the mapping relationship to obtain the service type set, and wherein the first target service type comprises a call answering.

21. The terminal of claim 19, wherein the instructions cause the processor to be configured to:
receive a notification message from an operating system or an application, wherein the notification message comprises a short message service message or an instant messaging message; and
query, based on the short message service message or the instant messaging message, the mapping relationship to obtain the service type set, and wherein the first target service type comprises the message viewing or a message replying.

22. The terminal of claim 19, wherein the instructions cause the processor to be configured to:
receive a notification message from an operating system or an application, wherein the notification message comprises an alarm message; and
query, based on the alarm message, the mapping relationship to obtain the service type set, and wherein the first target service type comprises a troubleshooting or an information query.

23. A computer program product comprising computer-executable instructions stored on a non-transitory computer-readable storage medium that, when executed by a processor cause an apparatus to:

detect a target event that can trigger a voice interaction;
query, based on the target event, a mapping relationship to obtain a service type set and a first probability corresponding to a first target service type, wherein the first probability indicates a possibility of executing a first service corresponding to the first target service type;
collect a voice instruction comprising semantic information;
obtain, based on the semantic information, a second service corresponding to the semantic information;
execute the second service according to the voice instruction when a first service type of the second service is the first target service type;
filter out, from the service type set, a second target service type comprising a second probability that does not meet a probability threshold before executing the second service and when the first service type is the first target service type;
update, based on the semantic information, a third probability in the mapping relationship;
increase a fourth probability corresponding to the first service type in the mapping relationship when the first service type is the first target service type;
decrease the first probability when the first service type is different from the first target service type; and
increase the fourth probability when the semantic information comprises a wakeup word.

24. The computer program product of claim 23, wherein the computer-executable instructions that, when executed by the processor cause the apparatus to:
receive a notification message from an operating system or an application, wherein the notification message comprises a call notification; and
query, based on the call notification, the mapping relationship to obtain the service type set, and wherein the first target service type comprises a call answering.

25. The computer program product of claim 23, wherein the computer-executable instructions that, when executed by the processor cause the apparatus to:
receive a notification message from an operating system or an application, wherein the notification message comprises a short message service message or an instant messaging message; and
query, based on the short message service message or the instant messaging message, the mapping relationship to obtain the service type set, and wherein the first target service type comprises the message viewing or a message replying.

26. The computer program product of claim 23, wherein the computer-executable instructions that, when executed by the processor cause the apparatus to:
receive a notification message from an operating system or an application, wherein the notification message comprises an alarm message; and
query, based on the alarm message, the mapping relationship to obtain the service type set, and wherein the first target service type comprises a troubleshooting or an information query.

* * * * *